(12) United States Patent
Bai et al.

(10) Patent No.: US 11,335,028 B2
(45) Date of Patent: May 17, 2022

(54) CONTROL METHOD BASED ON FACIAL IMAGE, RELATED CONTROL DEVICE, TERMINAL AND COMPUTER DEVICE

(71) Applicant: GUANGDONG OPPO MOBILE TELECOMMUNICATIONS CORP., LTD., Guangdong (CN)

(72) Inventors: Jian Bai, Guangdong (CN); Guohui Tan, Guangdong (CN); Haitao Zhou, Guangdong (CN); Ziqing Guo, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 380 days.

(21) Appl. No.: 16/423,073

(22) Filed: May 27, 2019

(65) Prior Publication Data
US 2019/0279398 A1    Sep. 12, 2019

Related U.S. Application Data

(63) Continuation of application No. PCT/CN2019/076157, filed on Feb. 26, 2019.

(30) Foreign Application Priority Data

Feb. 27, 2018  (CN) .......................... 201810161936.0
Feb. 27, 2018  (CN) .......................... 201810161946.4
(Continued)

(51) Int. Cl.
*G06T 7/80*   (2017.01)
*G06T 7/521*  (2017.01)
(Continued)

(52) U.S. Cl.
CPC ............... *G06T 7/80* (2017.01); *G06T 7/521* (2017.01); *G06T 7/536* (2017.01); *G06T 7/55* (2017.01);
(Continued)

(58) Field of Classification Search
CPC .............. G03B 7/08; G06F 1/3231; G06K 2009/00322; G06K 2209/401;
(Continued)

(56) References Cited

U.S. PATENT DOCUMENTS

2013/0177210 A1   7/2013  Jeong et al.
2013/0195316 A1*  8/2013  Bataller ............... G06K 9/6255
                                                          382/103
(Continued)

FOREIGN PATENT DOCUMENTS

CN     1555051      12/2004
CN    101216881      7/2008
(Continued)

OTHER PUBLICATIONS

SIPO, First Office Action for CN Application No. 201810162447, dated Apr. 2, 2019.
(Continued)

*Primary Examiner* — Gelek W Topgyal
(74) *Attorney, Agent, or Firm* — Hodgson Russ LLP

(57) ABSTRACT

The present disclosure provides a control method of a camera module, a control device, a terminal, a nonvolatile computer readable storage medium and a computer device. The control method includes: obtaining a projection distance between a target user and the camera module; determining a control parameter of the camera module according to the projection distance and controlling the camera module based on the control parameter.

24 Claims, 22 Drawing Sheets

(30) Foreign Application Priority Data

Feb. 27, 2018 (CN) .......................... 201810162447.7
Apr. 28, 2018 (CN) .......................... 201810404834.7

(51) Int. Cl.
| | |
|---|---|
| *H04N 5/232* | (2006.01) |
| *G06T 7/55* | (2017.01) |
| *G06T 7/536* | (2017.01) |
| *H04N 5/225* | (2006.01) |
| *G06V 40/16* | (2022.01) |

(52) U.S. Cl.
CPC .......... *G06V 40/161* (2022.01); *G06V 40/168* (2022.01); *G06V 40/172* (2022.01); *H04N 5/2256* (2013.01); *H04N 5/23219* (2013.01); *G06T 2207/10028* (2013.01); *G06T 2207/30201* (2013.01); *G06V 40/178* (2022.01)

(58) Field of Classification Search
CPC .......... G06K 9/00228; G06K 9/00268; G06K 9/00288; G06T 2207/1008; G06T 2207/30201; G06T 7/521; G06T 7/536; G06T 7/55; G06T 7/80; H04N 5/2226; H04N 5/2256; H04N 5/2258; H04N 5/23219; H04N 5/2354; H04N 5/33
See application file for complete search history.

(56) References Cited

U.S. PATENT DOCUMENTS

| | | | | |
|---|---|---|---|---|
| 2015/0042871 A1* | 2/2015 | Zheng | ................. | H04N 5/2354 348/370 |
| 2015/0226541 A1* | 8/2015 | Aoki | ................. | H04N 5/367 348/140 |
| 2015/0244997 A1 | 8/2015 | Masuko et al. | | |
| 2016/0109232 A1 | 4/2016 | Shin et al. | | |
| 2016/0166145 A1* | 6/2016 | Choukroun | ............ | A61B 3/145 351/246 |
| 2017/0054962 A1* | 2/2017 | Zhou | ................. | G06T 7/521 |
| 2017/0180622 A1* | 6/2017 | Zabatani | ................. | F16K 17/02 |
| 2018/0084240 A1* | 3/2018 | Campbell | ............ | H04N 13/254 |
| 2018/0088214 A1* | 3/2018 | O'Keeffe | ................. | G01S 7/489 |
| 2019/0012784 A1* | 1/2019 | Wiley | ................. | A61B 3/111 |

FOREIGN PATENT DOCUMENTS

| | | |
|---|---|---|
| CN | 101384941 | 3/2009 |
| CN | 101452181 | 6/2009 |
| CN | 101692281 | 4/2010 |
| CN | 101751219 | 6/2010 |
| CN | 102362220 | 2/2012 |
| CN | 103152525 | 6/2013 |
| CN | 103418138 | 12/2013 |
| CN | 103488980 | 1/2014 |
| CN | 203800971 | 8/2014 |
| CN | 104268544 | 1/2015 |
| CN | 204130899 | 1/2015 |
| CN | 104349072 | 2/2015 |
| CN | 10496776 | 10/2015 |
| CN | 105120017 | 12/2015 |
| CN | 105354792 | 2/2016 |
| CN | 105373223 | 3/2016 |
| CN | 105451011 | 3/2016 |
| CN | 105680320 | 6/2016 |
| CN | 105791681 | 7/2016 |
| CN | 105791681 B * | 7/2016 ......... H04N 5/23219 |
| CN | 105874473 | 8/2016 |
| CN | 205490686 | 8/2016 |
| CN | 105959581 | 9/2016 |
| CN | 106022275 | 10/2016 |
| CN | 205754594 | 11/2016 |
| CN | 106203285 | 12/2016 |
| CN | 106331517 | 1/2017 |
| CN | 205921676 | 2/2017 |
| CN | 106597789 | 4/2017 |
| CN | 106651406 | 5/2017 |
| CN | 106938370 | 7/2017 |
| CN | 206508403 | 9/2017 |
| CN | 107330316 | 11/2017 |
| CN | 107423716 | 12/2017 |
| CN | 107451561 | 12/2017 |
| CN | 107680128 | 2/2018 |
| CN | 108281880 | 7/2018 |
| CN | 108376251 | 8/2018 |
| CN | 108376252 | 8/2018 |
| CN | 108769509 | 11/2018 |
| JP | 2007006016 | 1/2007 |
| JP | 2010263581 | 11/2010 |

OTHER PUBLICATIONS

SIPO, First Office Action for CN Application No. 201810404834, dated Feb. 19, 2019.
EPO, Office Action for EP Application No. 19736567.9, dated Mar. 9, 2020.
SIPO, First Office Action for CN Application No. 201810161936.0, dated Jun. 10, 2019.
SIPO, First Office Action for CN Application No. 201810161946.4, dated Jun. 5, 2019.
WIPO, ISR for PCT/CN2019/076157, dated Jun. 3, 2019.
SIPO, Third Office Action for CN Application No. 201810161936.0, dated Dec. 11, 2019.
SIPO, Second Office Action for CN Application No. 201810161936.0, dated Sep. 9, 2019.
SIPO, Second Office Action for CN Application No. 201810161946.4, dated Sep. 9, 2019.
IPI, Office Action for IN Application No. 201917031567, dated Oct. 22, 2020.

* cited by examiner

CONTROL METHOD BASED ON FACIAL IMAGE, RELATED CONTROL DEVICE, TERMINAL AND COMPUTER DEVICE

CROSS-REFERENCE TO RELATED APPLICATION

This application is a continuation of International Application No. PCT/CN2019/076157, filed Feb. 26, 2019, which claims priority to Chinese Patent Application No. 201810161946.4, 201810162447.7, filed Feb. 27, 2018, Chinese Patent Application No. 201810161936.0, filed Feb. 27, 2018, and Chinese Patent Application No. 201810404834.7, filed Apr. 28, 2018. The entire disclosures of the aforementioned applications are incorporated herein by reference.

FIELD

The present application relates to the field of image technology, and more particularly, to a control method of a camera module, a control device of a camera module, a terminal, a nonvolatile computer readable storage medium, and a computer device.

BACKGROUND

A laser projector may emit laser light with preset pattern information and may project the laser light onto a target user in space. A laser light pattern reflected by the target user may be acquired by an imaging device, to further obtain a depth image of the target user.

SUMMARY

Embodiments of the present disclosure provide a control method of a camera module, a control device of a camera module, a terminal, a nonvolatile computer readable storage medium, and a computer device.

The control method of a camera module according to embodiments of the present disclosure includes: obtaining a projection distance between a target user and the camera module; and determining a control parameter of the camera module according to the projection distance and controlling the camera module based on the control parameter.

The control device of a camera module according to embodiments of the present disclosure includes a master distance obtaining module and a master control module. The master distance obtaining module is configured to obtain a projection distance between a target user and the camera module. The master control module is configured to determine a control parameter of the camera module according to the projection distance and control the camera module based on the control parameter.

The terminal according to embodiments of the present disclosure includes a camera module, a processor and a controller. The processor is configured to: obtain a projection distance between a target user and a camera module and determine a control parameter of the camera module according to the projection distance. The controller is configured to control the camera module based on the control parameter.

The nonvolatile computer readable storage medium according to embodiments of the present disclosure includes computer executable instructions. When the computer executable instructions are executed by one or more processors, the one or more processors are configured to execute the above control method.

The computer device according to embodiments of the present disclosure includes a memory and a processor. The memory is configured to store computer readable instructions. When the instructions are executed by the processor, the processor is configured to perform the above control method.

Additional aspects and advantages of the present disclosure will be given in part in following descriptions, become apparent in part from the following descriptions, or be learned from the practice of the embodiments of the present disclosure.

BRIEF DESCRIPTION OF THE DRAWINGS

Above and/or additional aspects and advantages of embodiments of the present disclosure will become apparent and more readily appreciated from following descriptions with reference to accompanying drawings, in which.

DETAILED DESCRIPTION

Figure 1:
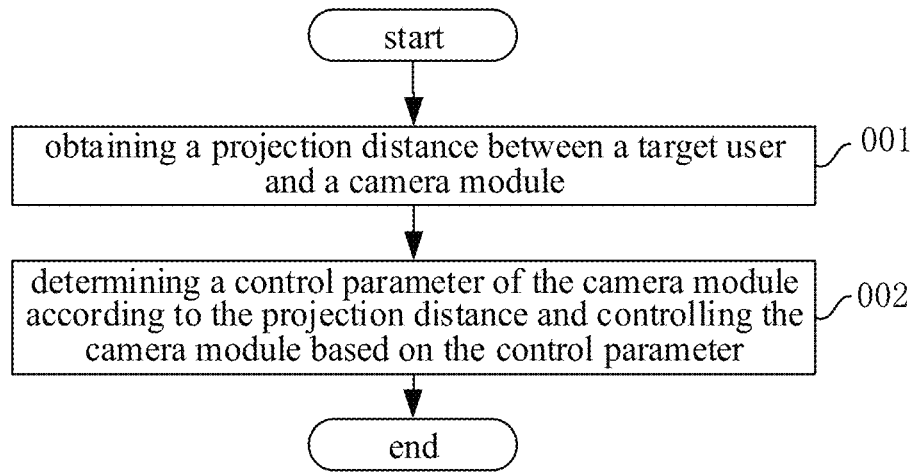
FIG. 1 is a schematic flowchart illustrating a control method according to some embodiments of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

In related arts, when power of laser light emitted by a laser projector is high, damage to a user is easily caused.

Therefore, the present disclosure provides a control method, a control device, a terminal, a computer device, and a storage medium.

As illustrated in FIG. 1, the present disclosure provides a control method of a camera module 60. The control method includes the following.

At block 001, a projection distance between a target user and the camera module 60 is obtained.

At block 002: a control parameter of the camera module 60 is determined according to the projection distance and the camera module 60 is controlled based on the control parameter.

In detail, in embodiments of the present disclosure, the control device 10 may be applied to a computer device. The computer device may be a phone, a tablet computer, a notebook computer, a smart wristband, a smart watch, a smart helmet, smart glasses, and a game machine. The terminal 100 according to implementations of the present disclosure may also be one of computer devices.

Figure 2:
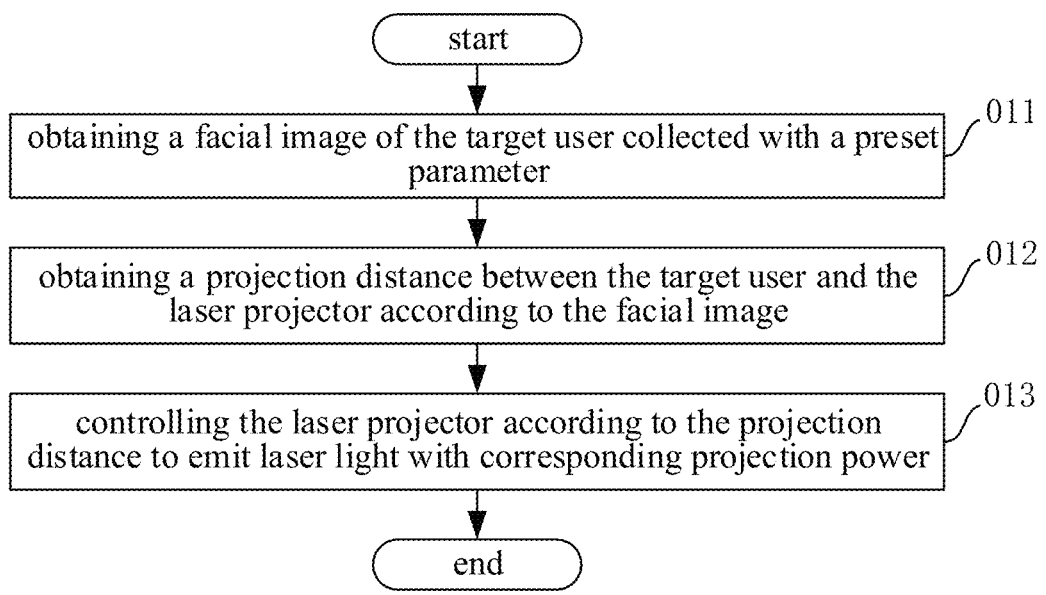
FIG. 2 is a schematic flowchart illustrating a control method according to some embodiments of the present disclosure.

As illustrated in FIG. 2, in one embodiment, the camera module 60 includes a laser projector 30. The control parameter includes projection power. The block 001 of obtaining the projection distance between the target user and the camera module 60 may include the following.

At block 011, a facial image of the target user captured with a preset parameter is obtained.

At block 012, a projection distance between the target user and the laser projector 30 is obtained according to the facial image.

The block 002 of determining the control parameter of the camera module 60 according to the projection distance and controlling the camera module 60 based on the control parameter may include the following.

At block 013, the laser projector 30 is controlled to emit laser light with corresponding projection power, according to the projection distance.

Embodiments of the present disclosure are described exemplarily by taking a phone as a terminal 100. The terminal 100 includes a camera 60, a processor 40, a controller 50. The camera module 60 of the terminal 100 includes an image capturing device 20 and a laser projector 30. The image capturing device 20 may be a visible camera to obtain an RGB facial image of the target user. The image capturing device 20 may also be an infrared camera to obtain an infrared facial image of the target user. Certainly, there may be a plurality of the image capturing devices 20. For example, there may be two visible cameras, two infrared cameras, or both the visible camera and the infrared camera. The preset parameter may be a focal length of the image capturing device 20 when capturing the facial image. Therefore, sizes of user's faces at same projection distances and captured by the image capturing device 20 are same. The laser projector 30 is configured to project a laser light pattern onto the target user. The image capturing device 20 may be further configured to capture a laser light pattern modulated by the target user and further generate a depth image of the target user for identity identification, dynamic capturing, and the like. The laser light may be infrared. When the projection power of the laser light is high or the projection distance from the target user to the laser projector 30 is short, the laser light emitted by the laser projector 30 may harm the user, for example, burning human eyes. The projection distance may be a distance between the user's face and a light exit surface of the laser projector 30. In an example, a light entrance surface of the image capturing device 20 may be in a same plane as the light exit surface of the laser projector 30. The controller 50 may be configured to control the laser projector 30 to emit the laser light with the corresponding projection power according to the projection distance. In detail, after the projection distance is obtained, the controller 50 may be configured to search for the projection power corresponding to the projection distance from a pre-stored correspondence table between the projection distance and the projection power, and to control the laser projector 30 to emit the laser light with the corresponding projection power, or to calculate the projection power corresponding to the projection distance in combination with a preset conversion coefficient. For example, when the conversion coefficient is K and the projection distance is D, the projection power may be P, where P=K×D.

The control method according to implementations illustrated in FIG. 2 may control the laser projector 30 to emit the laser light with the corresponding projection power according to the projection distance between the target user and the laser projector 30, thereby preventing the user being damaged caused by the high projection power of the laser projector 30.

Figure 3:
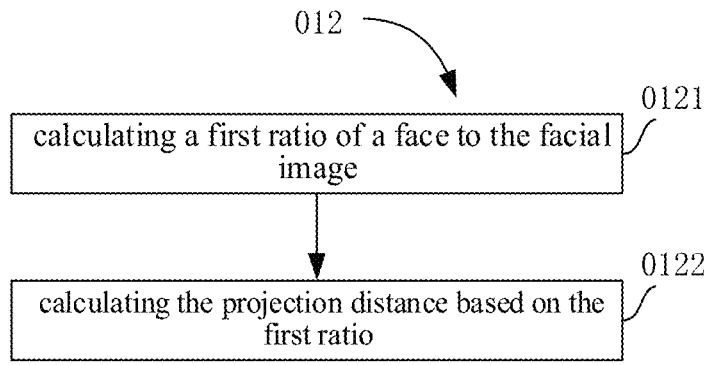
FIG. 3 is a schematic flowchart illustrating a control method according to some embodiments of the present disclosure.

As illustrated in FIG. 3, in some implementations, the block 012 may include the following.

At block 0121, a first ratio of the face to the facial image is determined.

At block 0122, the projection distance is calculated based on the first ratio.

In detail, a face region and a background region may be divided in the facial image by extracting and analyzing feature points of the face. The first ratio may be obtained by calculating a ratio of the number of pixels contained in the face region to the number of pixels contained in the facial image. It can be understood that the larger the first ratio, the closer the target user to the image capturing device 20 is.

That is, when the target user is close to the laser projection module 30, the projection distance is small. Therefore, the laser projector 30 is configured to emit the laser light with low projection power in case that the laser light emitted is too strong to burn the user's eyes. Meanwhile, when the first ratio is small, it is indicated that the target user is far away from the image capturing device 20. That is, the target user is far away from the laser projection module 30, and the projection distance is long. Therefore, the laser projector 30 is configured to project the laser light with high projection power. As a result, after the laser light pattern is projected onto the target user and reflected by the target user, the laser light pattern still has appropriate intensity for forming a depth image. In an example, when a plurality of faces are contained in one facial image, a face with a largest area is selected among the plurality of faces as the face region to calculate the first ratio, and regions occupied by other faces are used as a part of the background region.

The projection distance and the first ratio may be calibrated in advance. In detail, the user is directed to obtain the facial image at a preset projection distance. A calibration ratio corresponding to the facial image is calculated. A correspondence between the preset projection distance and the calibration ratio is stored, so as to calculate the projection distance according to an actual first ratio in subsequent operations. For example, the user is directed to obtain the facial image at a projection distance of about 30 cm, the calibration ratio corresponding to the facial image is calculated as about 45%. In actual measurements, when the first ratio is calculated as R, based on a triangle similarity principle, it may be derived as $$\sqrt{\frac{R}{45\%}} = \frac{D}{30\,\text{cm}},$$

where D is an actual projection distance calculated based on the first ratio R in the actual measurements. In this way, based on the first ratio of the face region to the facial image, an actual projection distance of the target user may be objectively reflected.

Figure 4:
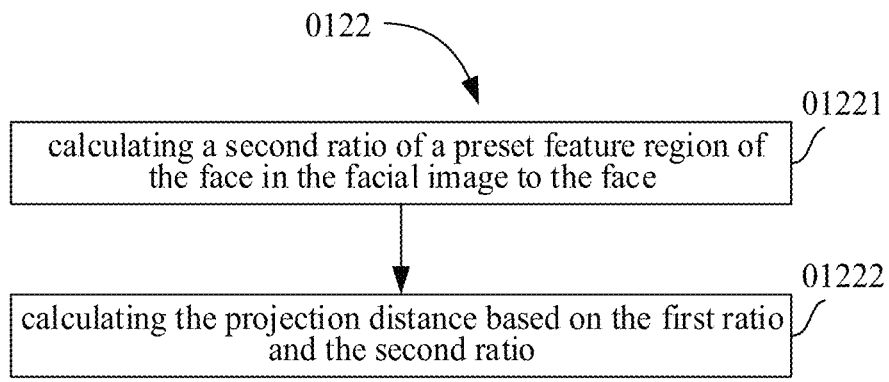
FIG. 4 is a schematic flowchart illustrating a control method according to some embodiments of the present disclosure.

As illustrated in FIG. 4, in some implementations, the block 0122 of calculating the projection distance based on the first ratio includes the following.

At block 01221, a second ratio of a preset feature region of the face to the face contained in the facial image is calculated.

At block 01222, the projection distance is calculated based on the first ratio and the second ratio.

It can be understood that sizes of faces vary with users, so that the first ratios of the face to the facial image of different users at the same projection distance are different. The second ratio is a ratio of the preset feature region of the face to the face. A feature region with a small difference among different individuals may be selected as the preset feature region. For example, the preset feature region may be the distance between the eyes of the user. When the second ratio is large, it is indicated that the user's face is small. Therefore, the projection distance calculated only based on the first ratio is large. When the second ratio is small, it is indicated that the user's face is large. Therefore, the projection distance calculated only based on the first ratio is small. In actual usages, the first ratio, the second ratio and the projection distance may be calibrated in advance. In detail, the user is directed to photograph the facial image at the preset projection distance. The first calibration ratio and the second calibration ratio corresponding to the facial image are calculated. The correspondence among the preset projection distance, the first calibration ratio and the second calibration ratio are stored, so as to calculate a projection distance according to an actual first ratio and an actual second ratio in subsequent operations. For example, the user is directed to obtain a facial image at the projection distance of about 25 cm, the first calibration ratio corresponding to the facial image is calculated as about 50%, and the second calibration ratio is about 10%. In actual measurements, when the first ratio is calculated as R1 and the second ratio is calculated as R2, based on a triangle similarity principle, it may be derived as $$\sqrt{\frac{R1}{50\%}} = \frac{D}{25\,\text{cm}},$$

where D1 is an initial projection distance calculated based on the actually measured first ratio R1. A calibration projection distance D2 may be further calculated based on an equation $$\frac{D1}{10\%} = \frac{D2}{R2}$$

and the actually measured second ratio R2, where D2 is taken as the projection distance. In this way, the calculation of the projection distance based on the first ratio and the second ratio takes individual differences among the users into account, thereby objectively obtaining the projection distance.

Figure 5:
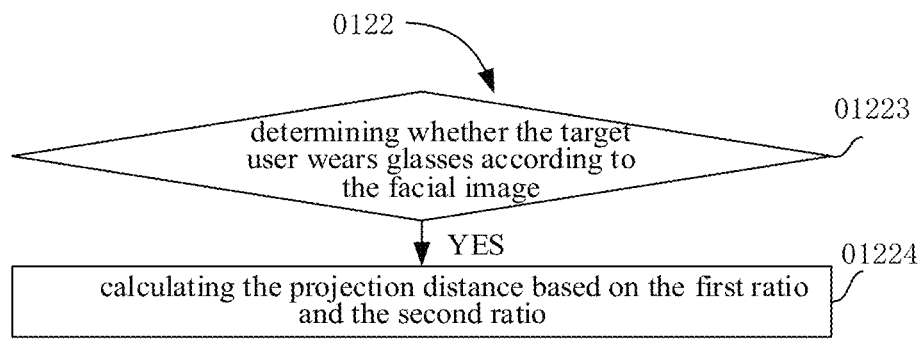
FIG. 5 is a schematic flowchart illustrating a control method according to some embodiments of the present disclosure.

As illustrated in FIG. 5, in some implementations, the block 0122 of calculating the projection distance based on the first ratio includes the following.

At block 01223, it is determined whether the target user wears glasses according to the facial image.

At block 01224, if yes, the projection distance is calculated based on the first ratio and a preset distance coefficient.

It can be understood that a healthy condition of the user's eyes may be characterized by whether the user wears the glasses. In detail, when the user wears the glasses, it is indicated that the user's eyes is already suffered from related eye diseases or have poor eyesight. When the laser light is projected onto a user wearing glasses, it is required to project the laser light with low power to avoid the eyes of the user from being harmed. The preset distance coefficient may be between 0 and 1, such as 0.6, 0.78, 0.82 or 0.95. For example, after the initial projection distance is calculated based on the first ratio, or after the calibration projection distance is calculated based on the first ratio and the second ratio, the initial projection distance or the calibration projection distance is multiplied by the distance coefficient to obtain a final projection distance. The final projection distance is used as the projection distance and used to calculate the projection power. In this way, particularly, it is possible to avoid the user suffering from the eye diseases or having the poor eyesight from being harmed caused by high power of the projected laser light.

Further, the distance coefficient may be unfixed. For example, the distance coefficient may be automatically adjusted according to intensity of visible light or infrared light in an ambient environment. When the facial image is an RBG image, an average value of intensity of the visible light of all the pixels contained in the facial image may be calculated. Different average values correspond to different distance coefficients. In detail, the larger the average value, the smaller the distance coefficient is. Similarly, when the facial image is an infrared image, an average value of intensity of the infrared light of all the pixels contained in the facial image may be calculated. Different average values correspond to different distance coefficients. The larger the average value, the smaller the distance coefficient is, and the smaller the average value, the larger the distance coefficient is.

Figure 6:
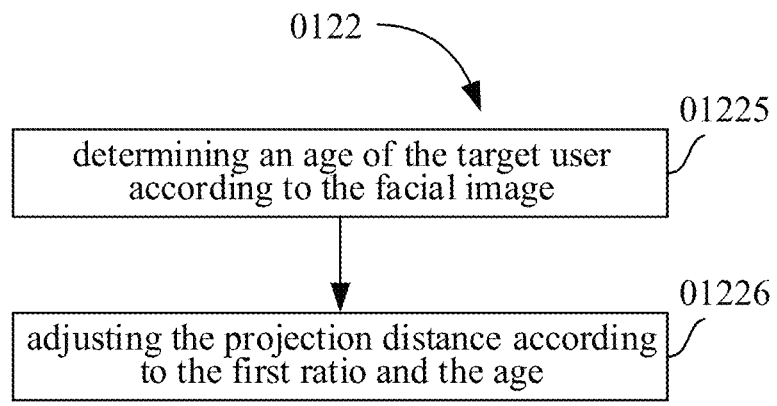
FIG. 6 is a schematic flowchart illustrating a control method according to some embodiments of the present disclosure.

As illustrated in FIG. 6, in some implementations, the block 0122 of calculating the projection distance based on the first ratio includes the following.

At block 01225, an age of the target user is determined according to the facial image.

At block 01226, the projection distance is adjusted according to the first ratio and the age.

People of different ages have different tolerances to infrared laser light. For example, a child and an elderly may be more likely to be burnt by the laser light. The laser light that is tolerable by an adult may be harmful to the child. In implementations, an amount, a distribution and an area of the feature points of facial wrinkles can be extracted from the facial image to determine the age of the target user. For example, the age of the target user may be determined by extracting the number of the wrinkles around the eyes, or further in combination with the number of wrinkles at forehead of the user. After the age of the user is determined, a proportional coefficient may be obtained according to the age of the user. In detail, a correspondence between the age and the proportional coefficient can be found in a lookup table. For example, when the age is under 15, the proportional coefficient is about 0.6. When the age is between 15 and 20, the proportional coefficient is about 0.8; when the age is between 20 and 45, the proportional coefficient is about 1.0. When the age is 45 or more, the proportional coefficient is about 0.8. After the proportional coefficient is obtained, an initial projection distance calculated based on the first ratio, and the calibration projection distance calculated based on the first ratio and the second ratio may be multiplied by the proportional coefficient to obtain the final projection distance. The final projection distance is used as the projection distance and used to calculate the projection power. In this way, it is possible to avoid, in particular, the user of a low age or a high age from being harmed due to the high power of the projected laser light.

Figure 7:
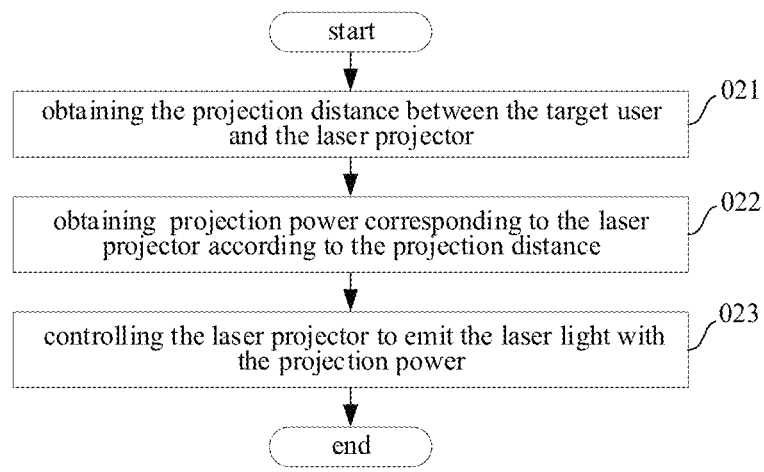
FIG. 7 is a schematic flowchart illustrating a control method according to some embodiments of the present disclosure.

As illustrated in FIG. 7 together, in another embodiment, the block 001 of obtaining the projection distance between the target user and the camera module 60 includes the following.

At block 021, the projection distance between the target user and the laser projector 30 is obtained.

The block 002 of determining the control parameter of the camera module 60 according to the projection distance and controlling the camera module 60 based on the control parameter includes the following.

At block 022, projection power corresponding to the laser projector 30 is obtained according to the projection distance.

At block 023, the laser projector 30 is controlled to emit the laser light with the projection power.

Embodiments of the present disclosure are described exemplarily by taking a phone as a terminal 100. The terminal 100 includes a distance detecting module 70, a laser projector 30, a processor 40 and a controller 50. The distance detecting module 70 may be configured to obtain the projection distance between the target user and the laser projector 30. A specific form of the distance detecting module 70 is not limited herein, which may be any distance detecting devices. For example, the distance detecting module 70 may send actively a detection signal to the target user and receive a detection signal reflected by the target user to obtain the projection distance. In this case, the distance detecting module 70 may be a proximity sensor or a depth camera. The distance detecting module 20 may also directly receive a detection signal sent by the target user or a detection signals reflected by the target user, to obtain the projection distance. In this case, the distance detecting module 70 may include a plurality of the imaging devices. Images of the target users at different angles captured by the plurality of the imaging devices are processed, to obtain depth information (the projection distance) of the target user.

The laser projector 70 is configured to project the laser light pattern onto a target user. The laser light pattern modulated by the target user may be captured by a target camera, to further generate a depth image of the target user for identity identification and dynamic capturing. The laser light may be infrared. When the projection power of the laser light is too large or the projection distance between the target user and the laser projector 30 is too small, the laser light emitted by the laser projector 30 may harm the user, for example, burning the human eyes. The projection distance may be a distance between the user's face and a light exit surface of the laser projector 30.

In one example, the laser projector 30 may be a part of the distance detecting module 70. That is, the laser projector 70 may be configured to detect the projection distance. In this case, the distance detecting module 70 further includes the target camera. In detail, the laser projector 70 may project the laser light pattern onto the target user with rated power. The target camera is further configured to capture the laser light pattern modulated by the target user, to further obtain the depth information of the target user, i.e., the projection distance.

The processor 40 may be configured to obtain the projection power corresponding to the laser projector 30 according to the projection distance. In detail, after the projection distance is obtained, the processor 40 may be configured to search for the projection power corresponding to the projection distance from a pre-stored correspondence table between the projection distance and the projection power. In an example, the projection power corresponding to the projection distance may be calculated in combination with a preset conversion coefficient. For example, when the conversion coefficient is K and the projection distance is D, the projection power P may be determined as $P=K \times D$. The controller 50 is configured to control the laser projector 30 to emit the laser light with the corresponding projection power. In detail, when the projection power of the laser projector 30 is controlled by the controller 50, the controller 50 may be configured to control emission power of a light source of the laser projector 30. The light source may be a vertical cavity surface emitting laser (VCSEL) or a distributed feedback laser (DFB).

The control method of the implementation illustrated in FIG. 7 may control the laser projector 30 to emit the laser light with the corresponding projection power, according to the projection distance between the target user and the laser projector 30, thereby preventing the user from being harmed due to the high projection power of the laser projector 30.

Figure 8:
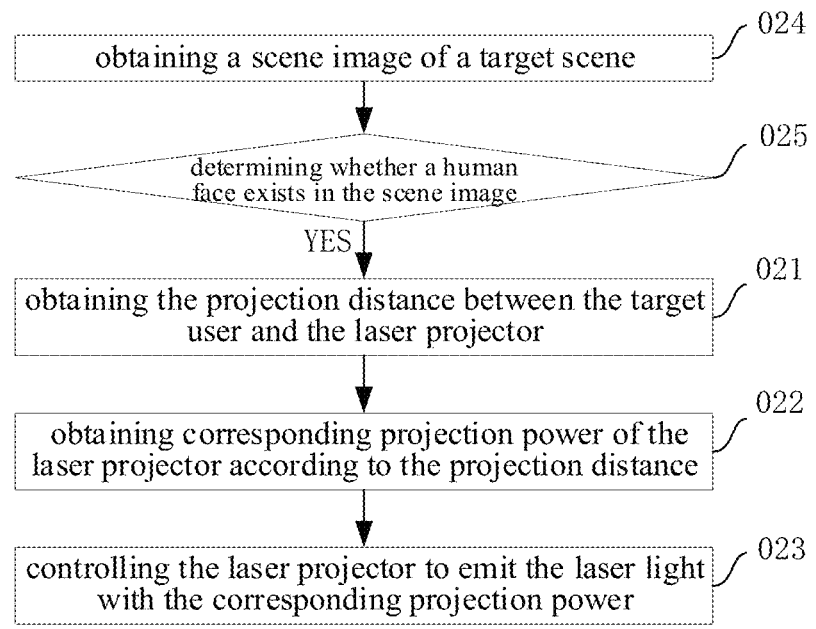
FIG. 8 is a schematic flowchart illustrating a control method according to some embodiments of the present disclosure.

As illustrated in FIG. 8, in some implementations, the control method further includes the following.

At block 024, a scene image of a target scene is obtained.

At block 025, it is determined whether a face exists in the scene image.

When the face exists in the scene image, the block 021 is executed.

It can be understood that the laser projector 30 of the terminal 100 may be suitable for a variety of different occasions for different purposes. In these occasions, it is possible that a projection target of the laser projector 30 does not involve a human body. For example, the laser projector 30 may be configured to measure a distance between the terminal 100 and a certain object, or to perform three-dimensional mapping of a certain object. At this time, the laser projector 30 may emit light with rated power, without obtaining the projection power by detecting in real time the projection distance, which is beneficial to reduce power consumption of the terminal 100.

In detail, the image capturing device 20 may be a visible camera to capture an RGB scene image of the target scene. The image capturing device 20 may also be an infrared camera to capture an infrared scene image of the target scene. The processor 40 is configured to obtain the scene image captured by the image capturing device 20, and determine whether a feature point similar to a facial feature is contained in the scene image to determine whether a face exists in the scene image, and further determine whether a human body exists in the target scene. When it is determined by the processor 40 that a face exists in the scene image, the projection distance between the target user and the laser projector 30 is obtained.

When an activating command of the laser projector 30 is inputted by a user on the terminal 100, it may be immediately determined by the processor 40 whether a face exists in the scene image. When it is determined that no face exists in the scene image, the laser projector 30 may emit the laser light with the rated power. Within a duration when the laser projector 30 is on, it may be still determined whether a face exists in the scene image at a preset interval. For example, the preset interval may be 2 seconds, 5 seconds, 6 seconds or 10 seconds. When a face exists in the scene image after the laser projector 30 is on, the processor 40 may transmit a judgment result whether a face exists to the distance detecting module 70. The distance detecting module 70 may obtain the projection distance between the target user and the laser projector 30. In this way, it is possible to prevent the human body within a projection range from being harmed by the laser projector 30 when the laser projector 30 is working with the high projection power.

Figure 9:
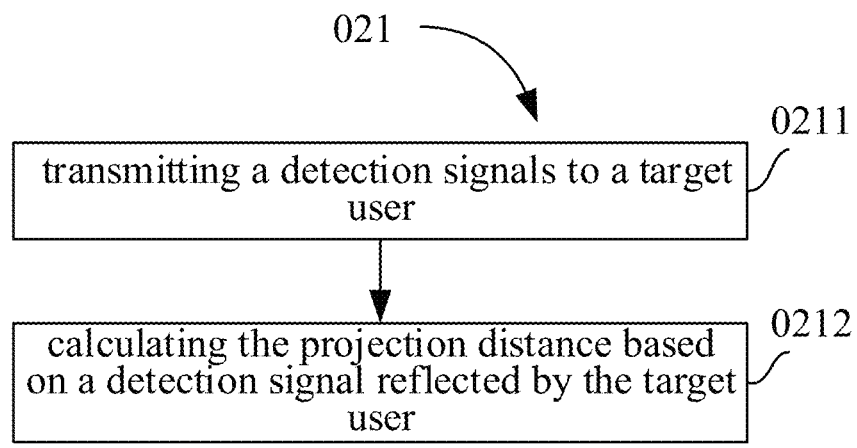
FIG. 9 is a schematic flowchart illustrating a control method according to some embodiments of the present disclosure.

As illustrated in FIG. 9, in some implementations, the block 021 includes the followings.

At block 0211, a detection signal is transmitted to the target user.

At block 0212, the projection distance is calculated based on a detection signal reflected by the target user.

The detection signal may be infrared light. The distance detecting module 70 may include a transmitter 71, a receiver 72 and a calculator 73. The transmitter 71 is configured to transmit the infrared light to the target user. The infrared light is partially reflected by the target user and received by the receiver 72. The calculator 73 may be configured to calculate the projection distance based on the reflected infrared light received by the receiver 72. In one example, the calculator 73 may be configured to calculate a path length of the infrared light from being transmitted to being received based on the intensity of the infrared light received by the receiver 72. A half of the path length is taken as the projection distance. It may be understood that the weaker the intensity of the infrared light received, the greater the projection distance. In another example, the calculator 73 may be also configured to calculate the projection distance based on time information of receiving by the receiver 72 the infrared light. In detail, a total propagation time of the infrared light between the terminal 100 and the target user is a difference between the time when the transmitter 71 transmits the infrared light and the time when the receiver 72 receives the infrared light. The projection distance may be calculated by multiplying a half of the time difference by a propagation speed of the infrared light in the air. Certainly, the detection signal may also be another type of detection signal, such as an ultrasonic wave, which is not limited herein.

Figure 10:
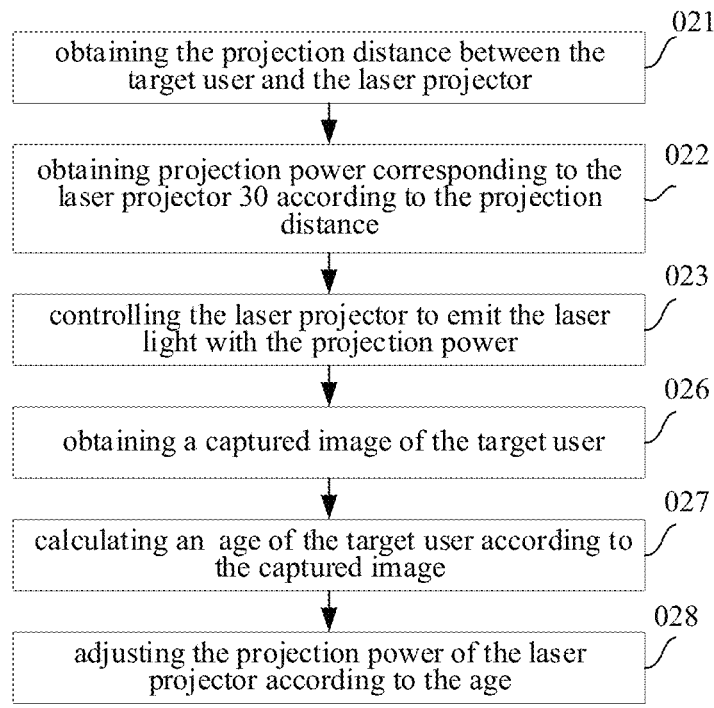
FIG. 10 is a schematic flowchart illustrating a control method according to some embodiments of the present disclosure.

As illustrated in FIG. 10, in some implementations, the control method further includes the following.

At block 026, a captured image of the target user is obtained.

At block 027, an age of the target user is calculated according to the captured image.

At block 028, the projection power of the laser projector is adjusted according to the age.

People of different ages have different tolerance to infrared laser light. For example, a child and an elderly may be more likely to be burnt by the laser light. The laser light that is tolerable by an adult may be harmful to child. In this implementation, an amount, a distribution and an area of the feature points of facial wrinkles may be extracted from the facial image to determine the age of the target user. For example, the age of the target user may be determined by extracting the number of the wrinkles around the eyes, or further in combination with the number of wrinkles at forehead of the user. After the age of the user is determined, a proportional coefficient may be obtained according to the age of the user. In detail, a correspondence between the age and the proportional coefficient may be found in a lookup table. For example, when the age is under 15, the proportional coefficient is about 0.6. When the age is between 15 and 20, the proportional coefficient is about 0.8. When the age is between 20 and 45, the proportional coefficient is about 1.0. When the age is 45 or more, the proportional coefficient is about 0.8. After the proportional coefficient is obtained, an initial projection power calculated based on the projection distance may be multiplied by the proportional coefficient to obtain final projection power. The controller 50 may control the laser projector 30 to emit the laser light with the final projection power. In this way, it is possible to avoid, in particular, the user of a low age or a high age from being harmed by the projected laser light with the high power.

Figure 11:
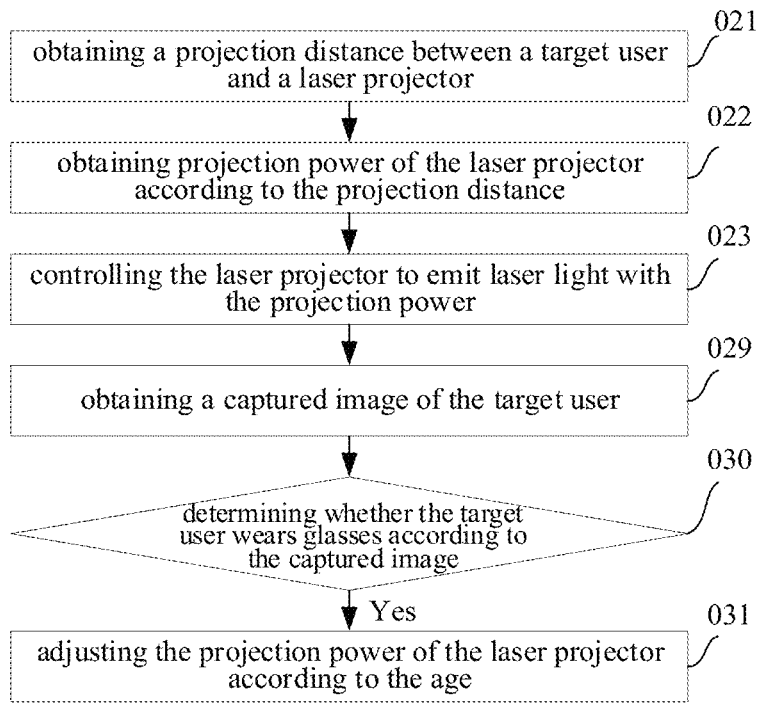
FIG. 11 is a schematic flowchart illustrating a control method according to some embodiments of the present disclosure.

As illustrated in FIG. 11, in some implementations, the control method further includes the following.

At block 029, a captured image of the target user is obtained.

At block 030, it is determined whether the target user wears glasses according to the captured image; and At block 031, when the target user wears glasses, the projection power of the laser projector 30 is reduced.

It can be understood that a healthy condition of the user's eyes may be characterized by whether the user wears the glasses. In detail, when the user wears glasses, it is indicated that the user's eyes is already suffered from related eye diseases or have poor eyesight. When the laser light is projected onto a user wearing glasses, it is required to project the laser light with low power to avoid the eyes of the user from being harmed. In detail, when the projection power is reduced by the processor 40, an initial projection power calculated based on the projection distance may be multiplied by a preset adjustment coefficient to obtain the final projection power. The preset adjustment coefficient may be a coefficient between 0 and 1, such as 0.6, 0.78, 0.82 or 0.95. The controller 50 may control the laser projector 30 to emit the laser light based on the final projection power. In this way, particularly, it is possible to avoid the user suffering from the eye diseases or having the poor eyesight from being harmed caused by high power of the projected laser light.

Further, the adjustment coefficient may be unfixed. For example, the adjustment coefficient may be automatically adjusted according to intensity of visible light or infrared light in an ambient environment. When the captured image is an RBG image, an average value of intensity of the visible light of all the pixels contained in the captured image may be calculated. Different average values correspond to different adjustment coefficients. In detail, the larger the average value, the smaller the adjustment coefficient is. Similarly, when the captured image is an infrared image, an average value of intensity the infrared light of all the pixels contained in the captured image may be calculated. Different average values correspond to different adjustment coefficients. The larger the average value, the smaller the adjustment coefficient is, and the smaller the average value, the larger the adjustment coefficient is.

Figure 12:
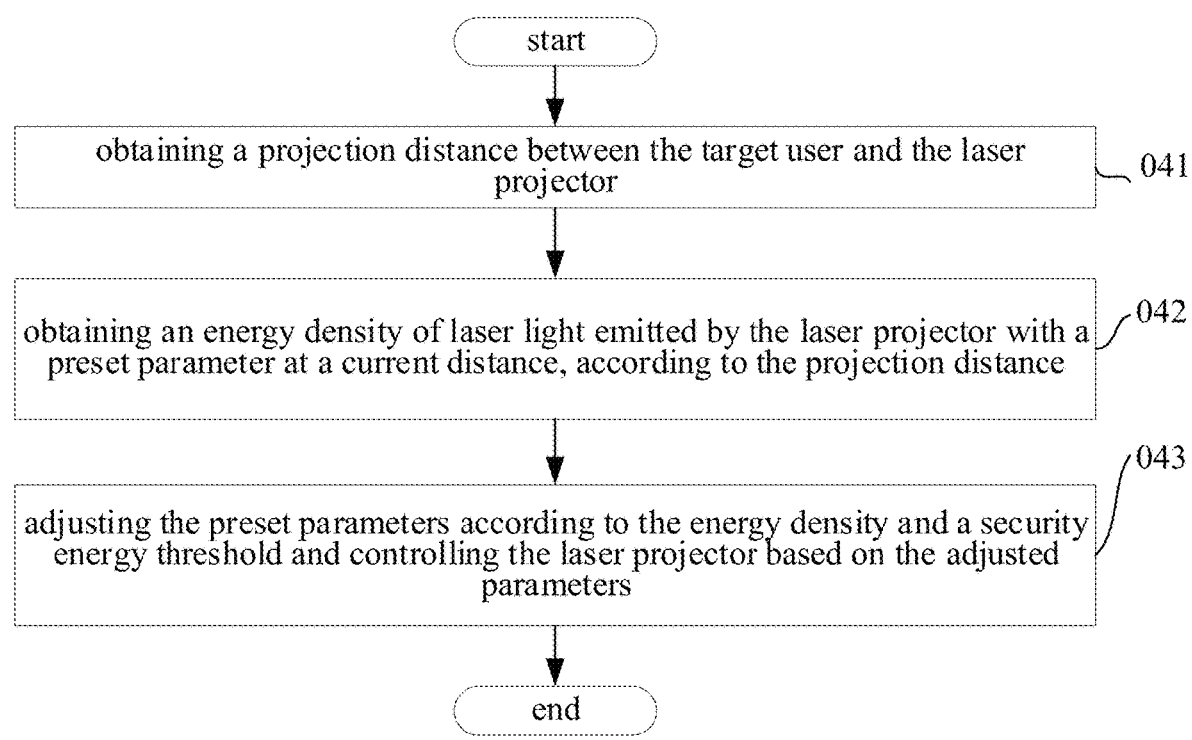
FIG. 12 is a schematic flowchart illustrating a control method according to some embodiments of the present disclosure.

As illustrated in FIG. 12, in another embodiment, the camera module 60 includes the laser projector 30. The block 001 of obtaining the projection distance between the target user and the camera module 60, includes the following.

At block 041, the projection distance between the target user and the laser projector 30 is obtained.

The block 002 of determining the control parameter of the camera module 60 according to the projection distance and controlling the camera module 60 based on the control parameter includes the following.

At block 042, an energy density when the laser projector 30 at a current distance emits the laser light with a preset parameter is obtained according to the projection distance.

At block 043, the preset parameter is adjusted according to the energy density and a safety energy threshold and the laser projector 30 is controlled based on the adjusted preset parameter.

Embodiments of the present disclosure are described exemplarily by taking a phone as a terminal 100. The terminal 100 includes an image capturing device 20 and a laser projector 30. The laser projector 30 is configured to project a laser light pattern onto the target user. The image capturing device 20 may be an infrared camera. There may be one or more infrared cameras, for capturing a laser light pattern modulated by the target user, and further generating a depth image of the target user for identity identification, dynamic capturing or the like. The laser light may be infrared. The preset parameter of the laser projector 30 includes projection power, projection frequency or the like. It can be understood that the laser projector 30 projects the laser light pattern onto the target user based on a certain preset parameter. Energy of the projected infrared light is attenuated with a traveling distance. Radiation received by the human body is gradually weakened. The human body or the human eyes have a threshold of receiving the energy density of laser light within a unit time. Generally, when the projection power of the laser light is too large or the projection distance between the target user and the laser projector 30 is too small and the energy density received by the human eye is greater than the threshold, the laser light emitted by the laser projector 30 may harm the user, such as burning the human eyes. The projection distance may be a distance between the user's face and a light exit surface of the laser projector 30. In one example, a light entrance surface of the image capturing device 20 may be in the same plane as the light exit surface of the laser projector 30. The distance of the laser projector 30 is inversely related to the energy density received by the human eyes.

The distance between the target user and the laser projector 30 may be detected by various sensors of the terminal 100, such as a proximity sensor, a depth camera, a front RGB camera, or a laser projector 30, coordinated with the image capturing device, which is not limited herein. The processor 40 processes received data from an associated sensor or hardware to obtain the distance between the target user and the laser projector 30.

When the laser projector 30 of a preset type emits the laser light with a preset parameter, the energy density received by the human eyes is substantially fixed. In specific operations, a correspondence among the preset parameter, the projection distance and the energy density may be measured before being shipped, and may be stored in a memory of the terminal 100. After the projection distance between the target user and the laser projector 30 is obtained, the energy density of the laser projector at the current distance emitting the laser with the preset parameter may be obtained by searching the preset correspondence between the projection distance and the energy density.

The controller 50 may be configured to adjust the parameter of the laser projector 30 according to the energy density and the safety energy threshold acceptable by the human eye at the current projection distance, and to control the laser projector 30 to emit the laser light based on the adjusted parameter. The adjustment of the parameter may involve one or more of a plurality of parameters, which is not limited herein.

The control method according to the implementation illustrated as FIG. 12 may control the projection parameter of the laser projector 30 according to the projection distance between the target user and the laser projector 30 and the projection energy density, thereby preventing the user from being harmed since the projection energy density of the laser projector 30 is too high.

Figure 13:
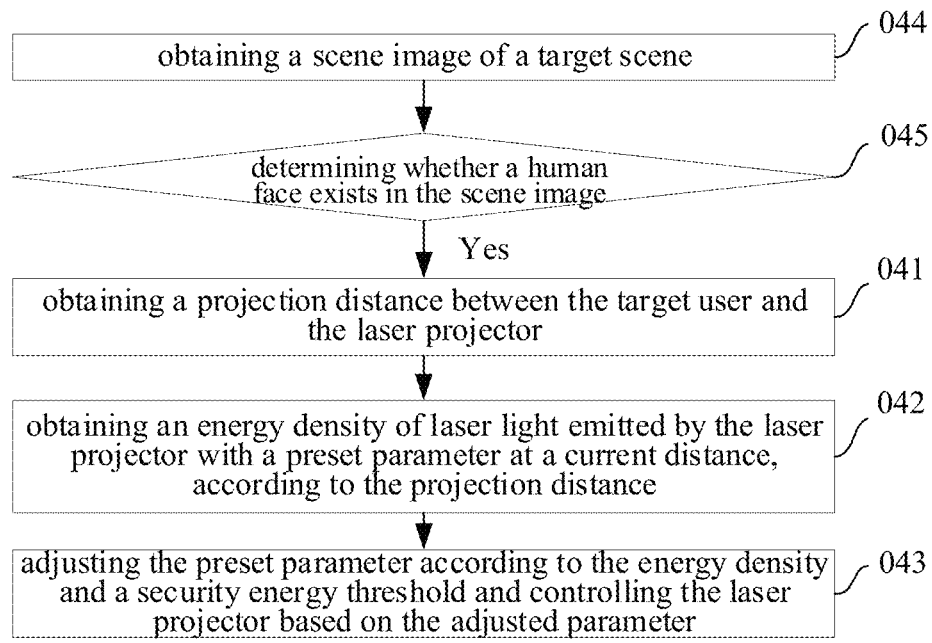
FIG. 13 is a schematic flowchart illustrating a control method according to some embodiments of the present disclosure.

As illustrated in FIG. 13, in some implementations, the control method further includes the following.

At block 044, a scene image of a target scene is obtained.

At block 045, it is determined whether a face exists in the scene image.

At block 046, if yes, the block 041 is executed.

The image capturing device 20 may be a visible camera, such as a front camera of the terminal 100. It can be understood that the laser projector 30 is disposed on a front panel of the terminal 100 and is faced towards the target user. The image capturing device 20 can obtain an RGB image of the target scene. The image capturing device 20 can also be an infrared camera to obtain an infrared image of the target scene. There may be a plurality of the image capturing devices 20. For example, there may be two visible cameras, two infrared cameras, or both the visible camera and infrared camera. The preset parameter may be a focal length of the image capturing device 20 when capturing the scene image, to ensure that sizes of elements contained in a same scene at same projection distances and captured by the image capturing device 20 are same.

It can be understood that when there is no face in the target scene, a probability that the human eyes are harmed by the received laser light is low. It is required to control the laser projector 30 only when there is a face in the target scene.

Figure 14:
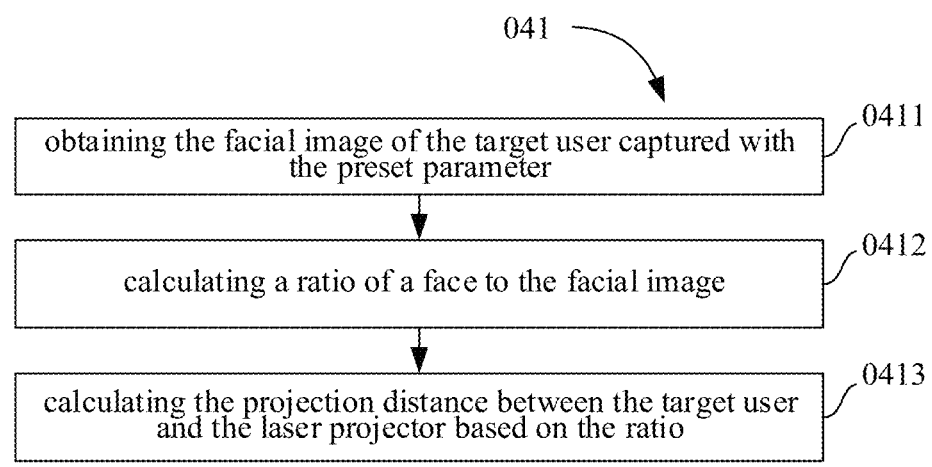
FIG. 14 is a schematic flowchart illustrating a control method according to some embodiments of the present disclosure.

As illustrated in FIG. 14, in some implementations, the block 041 includes the following.

At block 0411, a facial image of a target user captured with a preset parameter is obtained.

At block 0412, a ratio of a face to the facial image is calculated.

At block 0413, a projection distance between the target user and a laser projector is calculated based on the ratio.

In detail, the facial image may be divided into a face region and a background region by extracting and analyzing feature points of the face. The ration may be obtained by calculating a ratio of the number of pixels in the face region to the number of pixels in the facial image. It can be understood that when the ratio is large, the target user is relatively close to the image capturing device 20. That is, when the target user is close to the laser projection module 30, the projection distance is small. At this time, the projection parameter of the laser projector 30 needs to be adjusted in case the laser light emitter is too strong such that the energy density of the projected laser is too large to harm the user's eyes. At the same time, when the ratio is small, it is indicated that the target user is far away from the image capturing device 20. That is, the target user is far away from the laser projection module 30, the projection distance is large, and the energy density received by the human eyes is small. In an example, when a plurality of faces are included in the facial image, a face with a largest area is selected among the plurality of faces as the face region to calculate the ratio, and regions occupied by other faces are used as a part of the background region.

The projection distance and the ratio may be calibrated in advance. In detail, the user is directed to obtain the facial image at a preset projection distance. A calibration ratio corresponding to the facial image is calculated. A correspondence between the preset projection distance and the calibration ratio is sorted, in order to calculate the projection distance according to an actual ratio in subsequent operations. For example, the user is directed to obtain the facial image at a projection distance of 30 cm, the calibration ratio corresponding to the facial image is calculated as about 45%. In the measurements, when the first ratio is calculated as R, based on a triangle similar principle, it may be derived as $$\sqrt{\frac{R}{45\%}} = \frac{D}{30\,\text{cm}},$$

where D is an actual projection distance calculated based on the ratio R in the actual measurements. In this way, based on the ratio of the face to the facial image, an actual projection distance of the target user can be objectively reflected.

Figure 15:
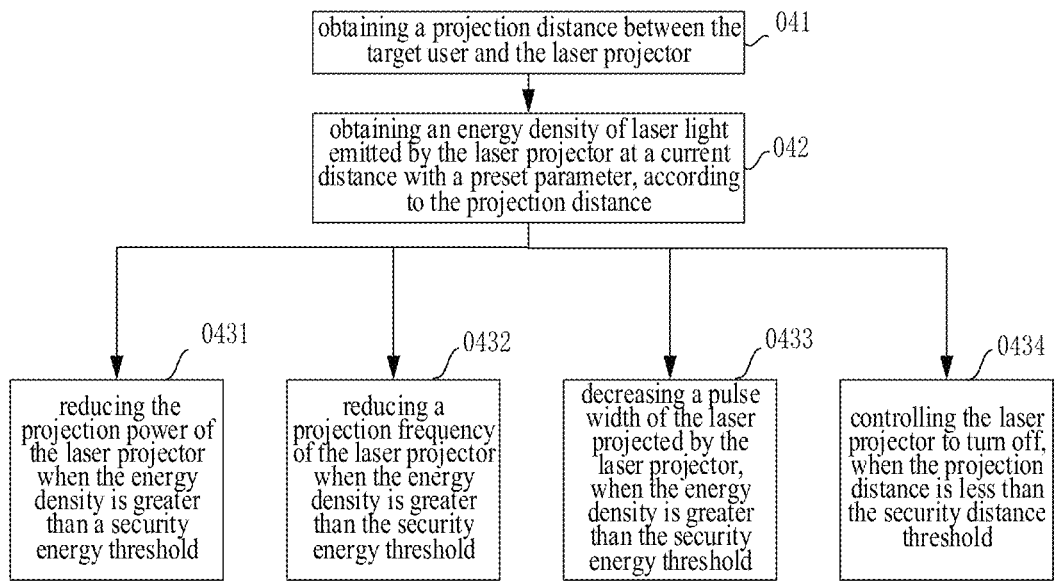
FIG. 15 is a schematic flowchart illustrating a control method according to some embodiments of the present disclosure.

As illustrated in FIG. 15, in some implementations, the block 043 includes the following.

At block 0431, the projection power of the laser projector 30 is reduced when the energy density is greater than the safety energy threshold.

In detail, it can be understood that at a current distance, by searching a preset correspondence, the projection power of the laser projection 30 may be reduced when the energy density, received by the user, of the laser light projected by the laser projector 30 with the preset parameter is greater than the safety projection threshold. The correspondence between the projection distance and the projection power can be determined when being shipped and stored in advance in a memory. In this correspondence, the projection power corresponding to the projection distance not only enables the laser light pattern projected by the laser projector 30 onto the target user to be captured by the image capturing device, but also enables the energy density received by the human eyes to be lower than the safety energy threshold after the power is adjusted. In operations, the projection power corresponding to the projection distance is searched for from the pre-stored correspondence between the projection distance and the projection power, and the laser projector 30 is controlled to emit the laser light with the corresponding projection power, or the projection power corresponding to the projection distance is calculated in combination with a preset conversion coefficient. For example, the conversion coefficient is K and the projection distance is D, the projection power may be P, where P=K×D.

As illustrated in FIG. 15, in some implementations, the block 043 includes the following.

At block 0432, a projection frequency of the laser projector 30 is reduced when the energy density is greater than the safety energy threshold.

In detail, it may be understood that, at a current distance, based on the preset correspondence, the projection frequency is reduced when the received energy density of the laser light emitted by the laser projector 30 with the preset parameter is greater than the safety projection threshold. The laser projector 30 emits the laser light in pulses and reduces energy accumulated by reducing the projection frequency, thereby reducing the energy density received by the human eyes.

As illustrated in FIG. 15, in some implementations, the block 043 includes the following.

At block 0433, a pulse width of the laser light projected by the laser projector 30 is reduced, when the energy density is greater than the safe energy threshold.

In detail, it can be understood that, at a current distance, by searching the preset correspondence, the pulse width of the laser light emitted is reduced when the energy density, received by the user, of the laser light emitted by the laser projector 30 with the preset parameter is greater than the safe energy threshold. The laser projector 30 emits the laser light in pulses, and reduces the pulse width of the laser light to reduce energy in a single projection, thereby reducing the energy density received by the human eyes similar to reducing the projection power.

As illustrated in FIG. 15, in some implementations, the block 043 further includes the following.

At block 0434, the laser projector 30 is controlled to turn off, when the projection distance is less than a safety distance threshold.

In detail, within a certain distance range, even when the laser projector 30 emits the laser light with lowest power, the energy density received by the human eyes is still greater than the safety threshold. Thus, the laser projector 30 may be temporarily turned off. When it is detected that the projection distance is greater than the safety threshold, the laser projector 30 is turned on to operate.

Figure 16:
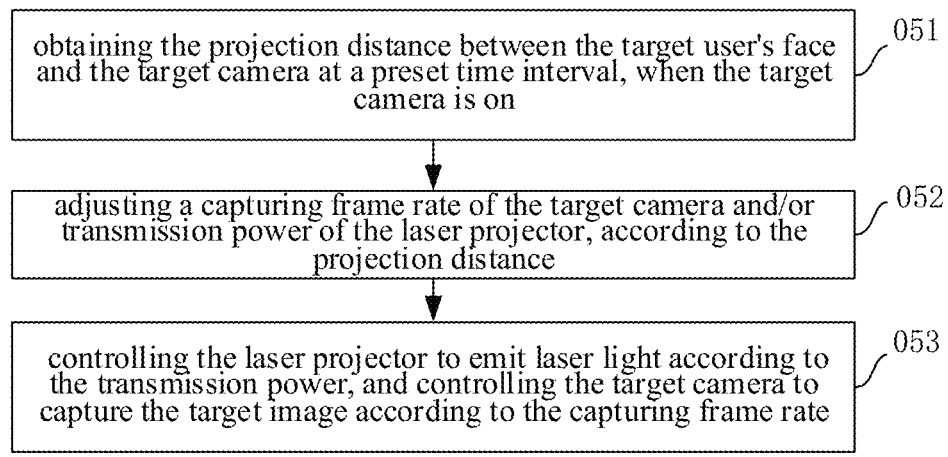
FIG. 16 is a schematic flowchart illustrating a control method according to some embodiments of the present disclosure.

As illustrated in FIG. 16, in another embodiment, the camera module 60 includes a laser projector 30 and a target camera. The control parameter includes a capturing frame rate of the target camera and/or transmission power (i.e., projection power) of the laser projector 30. The block 001 of obtaining the projection distance between the target user and the camera module 60 includes the following.

At block 051, a projection distance between a face of the target user and the target camera is obtained at a preset time interval, when the target camera is on.

The block 002 of determining the control parameter of the camera module 60 according to the projection distance and controlling the camera module 60 based on the control parameter includes the following.

At block 052, the capturing frame rate of the target camera and/or the transmission power of the laser projector 30 is adjusted, according to the projection distance.

At block 053, the laser projector 30 is controlled to emit the laser light with the transmission power, and the target camera is controlled to capture the target image at the capturing frame rate.

Embodiments of the present disclosure are described exemplarily by taking a phone as a terminal 100. The target camera (i.e., the laser camera 61) may be controlled by the terminal 100 to turn on. The laser projector 30 may be controlled by the terminal 100 to emit the laser light, such that the target image may be captured by the target camera. When the projection distance between the face and the target camera is too close, the laser light emitted by the laser projector 30 may cause certain damage to the human eyes. The closer the projection distance is, the more serious the damage to face is. The face is suffered from damages. When the target camera is on, the terminal 100 may obtain the projection distance between the face and the target camera at the preset time interval. The preset time interval for capturing may be set according to actual requirements, for example, 30 milliseconds, 1 second or the like. The projection distance between the face and the target camera may also be understood as the projection distance between the face and the terminal 100, or the projection distance between the face and the laser projector 30.

In one example, the terminal 100 may adjust the time interval for capturing according to a change degree of the projection distance between the face and the target camera. After obtaining a current projection distance between the face and the target camera, the terminal 100 may obtain a previous projection distance between the latest face and the target camera, calculate a difference between the current projection distance and the previous projection distance, and adjust the time interval for capturing according to the difference. A large difference indicates that a change of the projection distance between the face and the target camera is great. A capturing time period may be reduced and a capturing frequency may be increased. A small difference indicates that a change of the projection distance between the face and the target camera is small. The capturing time period may be increased and the capturing frequency may be reduced. According to the change of the projection distance between the face and the target camera, the time interval for capturing may be adjusted. Therefore, the projection distance between the face and the target camera may be obtained accurately and timely.

In an example, after obtaining the target image such as the infrared image and the speckle image through the target camera, the terminal 100 may obtain the depth information of the face according to the target image. In a coordinate system of the camera, a line perpendicular to an imaging plane and passing through a lens center is Z axis. When a set of coordinates of an object is (X, Y, Z) in the coordinate system of the camera, the Z value is the depth information of the object in the imaging plane of the camera. The terminal 100 may determine the projection distance between the face and the target camera according to the depth information of the face.

In one example, a distance sensor may be disposed on the terminal 100. The projection distance between the face and the target camera may be collected by the distance sensor. It may be understood that the terminal 100 may also obtain the projection distance between the face and the target camera in other manners, which is not limited to the above manner.

For the block 052, the terminal 100 may adjust the capturing frame rate of the target camera and/or the transmission power of the laser projector 30 according to the projection distance between the face and the target camera. The capturing frame rate refers to a frequency of capturing the target image via the target camera within a certain time, for example, 1 frame per second, 3 frames per second. The transmission power of the laser projector 30 may be intensity of the laser light emitted. The higher the transmission power, the higher the intensity of the laser light emitted.

The terminal 100 may adjust the capturing frame rate of the target camera and/or the transmission power of the laser projector 30 according to the projection distance between the face and the target camera. When the projection distance between the face and the target camera is too small, the capturing frame rate of the target camera may be reduced and/or the transmission power of the laser projector 30 may be reduced. Times of projection from the laser projector 30 within a certain period of time may be reduced by reducing the capturing frame rate of the target camera. Intensity of the laser light emitted by the laser projector 30 may be reduced by reducing the transmission power of the laser projector 30. Therefore, the damage to the human eyes caused by the laser light emitted by the laser projector 30 may be reduced. The smaller the projection distance between the face and the target camera is, the smaller the capturing frame rate of the target camera is, and/or the smaller the transmission power of the laser projector 30 is.

For the block 053, after the terminal 100 adjusts the capturing frame rate of the target camera and/or the transmission power of the laser projector 30 according to the projection distance between the face and the target camera, the laser projector 30 may be controlled to emit the laser light according to the adjusted transmission power, and the target camera may be controlled to capture the target image at the capturing frame rate.

In the embodiment illustrated as FIG. 16, when the target camera is in use, the projection distance between the face and the target camera is obtained at the preset time interval. The capturing frame rate of the target camera and/or the transmission power of the laser projector 30 is adjusted according to the projection distance. The laser projector 30 is controlled to emit the laser light according to the transmission power. The target camera is controlled to capture the target image according to the capturing frame rate. The capturing frame rate of the target camera and/or the transmission power of the laser projector 30 can be dynamically adjusted according to the projection distance between the face and the target camera, thereby reducing the damage to the human eyes caused by the laser light emitted by the laser projector 30 and protecting the human eyes.

In some implementations, the block 052 of adjusting the capturing frame rate of the target camera and/or the transmission power of the laser projector 30 according to the projection distance includes: reducing the capturing frame rate of the target camera, when the projection distance is less than a first distance threshold and greater than a second distance threshold.

In detail, the first distance threshold and the second distance threshold may be set by the terminal 100. The first distance threshold may be greater than the second distance threshold. The first distance threshold may be a security distance that the laser light emitted by the laser projector 30 does not affect the human eyes. The terminal 100 may determine whether the projection distance between the face and the target camera is less than the first distance threshold after obtaining the projection distance between the face and the target camera. When the projection distance is smaller than the first distance threshold, it is indicated that the laser light emitted by the laser projector 30 may harm the human eyes. The terminal 100 may further determine whether the projection distance between the face and the target camera is greater than the second distance threshold. When the projection distance between the face and the target camera is less than the first distance threshold and greater than the second distance threshold, it is indicated that the laser light emitted by the laser projector 30 may cause certain damage to the human eyes, and the damage is relatively slight. The terminal 100 can reduce only the capturing frame rate of the target camera without changing the transmission power of the laser projector 30.

In some implementations, the block 052 of adjusting the capturing frame rate of the target camera and/or the transmission power of the laser projector 30 according to the projection distance includes the following.

The capturing frame rate of the target camera and the transmission power of the laser projector 30 are reduced, when the projection distance is less than or equal to the second distance threshold.

A driving current of the laser projector 30 is reduced to a preset percentage of a rated driving current, when the projection distance is less than or equal to the second distance threshold and greater than a third distance threshold.

The driving current of the laser projector 30 is reduced to be less than a current threshold, when the projection distance is less than or equal to the third distance threshold. The current threshold is less than the preset percentage of the rated driving current.

In detail, when the projection distance between the face and the target camera is less than or equal to the second distance threshold, it is indicated that the laser light emitted by the laser projector 30 causes great damage to the human eyes. The terminal 100 may reduce the capturing frame rate of the target camera and reduce the transmission power of the laser projector 30. In an example, when the projection distance between the face and the target camera is less than or equal to the second distance threshold, the terminal 100 may determine whether the projection distance is greater than the third distance threshold. When the projection distance between the face and the target camera is less than or equal to the second distance threshold and greater than the third distance threshold, the capturing frame rate of the target camera may be reduced and the transmission power of the laser projector 30 may be reduced. Reducing the transmission power of the laser projector 30 may be reducing the driving current of the laser projector 30. The terminal 100 may reduce the driving current of the laser projector 30 to the preset percentage of the rated driving current. The preset percentage can be set according to the practical requirements, for example, 30%, 20%. The rated driving current refers to a normal driving current of the laser projector 30 when a distance between the face and the target camera is the security distance. When the projection distance between the face and the target camera is less than or equal to the third distance threshold, it is indicated that the laser light emitted by the laser projector 30 may cause serious damage to the human eyes. The terminal 100 can reduce the capturing frame rate of the target camera and reduce the transmission power of the laser projector 30, such that the driving current of the laser projector 30 may be reduced to be less than the current threshold. The current threshold can be less than the preset percentage of the rated driving current. The terminal 100 can greatly reduce the transmission power of the laser projector 30, thereby protecting the human eyes to a greatest extent.

In some implementations, the block 052 includes recovering the capturing frame rate of the target camera to a standard frame rate and recovering the transmission power of the laser projector 30 to the rated power when the projection distance is greater than or equal to the first distance threshold.

In detail, the terminal 100 may set the standard frame rate of the target camera and the rated power of the laser projector 30. When the projection distance between the face and the target camera is greater than or equal to the first distance threshold, it is indicated that the face is at the security distance from the target camera. The laser projector 30 can be controlled to emit the laser light according to the rated power and the target camera may be controlled to capture the target image at the standard frame rate.

For example, the terminal 100 can establish a relational function among a projection distance range and the capturing frame rate of the target camera and the transmission power of the laser projector 30. Different projection distance ranges correspond to different capturing frame rates of the target camera and different transmission power of the laser projector 30. For example, when the projection distance range is greater than or equal to the first distance threshold of 20 cm, the capturing frame rate of the target camera is the standard frame rate, i.e., 30 frames/second and the transmission power of the laser projector 30 is the rated power, i.e., 1000 mW. When the projection distance range is less than the first distance threshold of 20 cm and greater than the second distance threshold of 10 cm, the capturing frame rate of the target camera is about 1 frame/second, and the transmission power of the laser projector 30 is about 1000 mW. When the projection distance interval is less than or equal to the second distance threshold of 10 cm and greater than the third distance threshold of 3 cm, the capturing frame rate of the target camera is about 1 frame/sec and the transmission power of the laser projector 30 is about 300 mW. When the projection distance interval is less than or equal to the third distance threshold of 3 cm, the capturing frame rate of target camera is about 1 frame/second and the transmission power of the laser projector 30 is about 125 mW. It can be understood that the projection distance range can be set according to practical requirements, and the capturing frame rate of the target camera and the transmission power of the laser projector 30 corresponding to the projection distance range can also be set according to practical requirements, which are not limited to the above conditions. By setting different projection distance ranges and by setting the capturing frame rate of the target camera and the transmission power of the laser projector 30 corresponding to each of the projection distance ranges, the human eyes may be protected to a greatest extent and a loss of the captured target image may be minimized.

The terminal 100 may obtain the projection distance between the face and the target camera at the preset time interval to determine the projection distance range to which the projection distance belongs, and obtain the capturing frame rate of the target camera and the transmission power of the laser projector 30 corresponding to the projection distance range. The laser projector 30 may be controlled to emit the laser light according to the corresponding transmission power. The target camera may be controlled to capture the target image at the corresponding capturing frame rate.

Therefore, the capturing frame rate of the target camera and/or the transmission power of the laser projector 30 may be dynamically adjusted according to the projection distance between the face and the target camera, thereby ensuring that a normal target image may be obtained, reducing the damage to the human eyes caused by the laser light emitted by the laser projector 30, and protecting the security of the human eyes.

Figure 17:
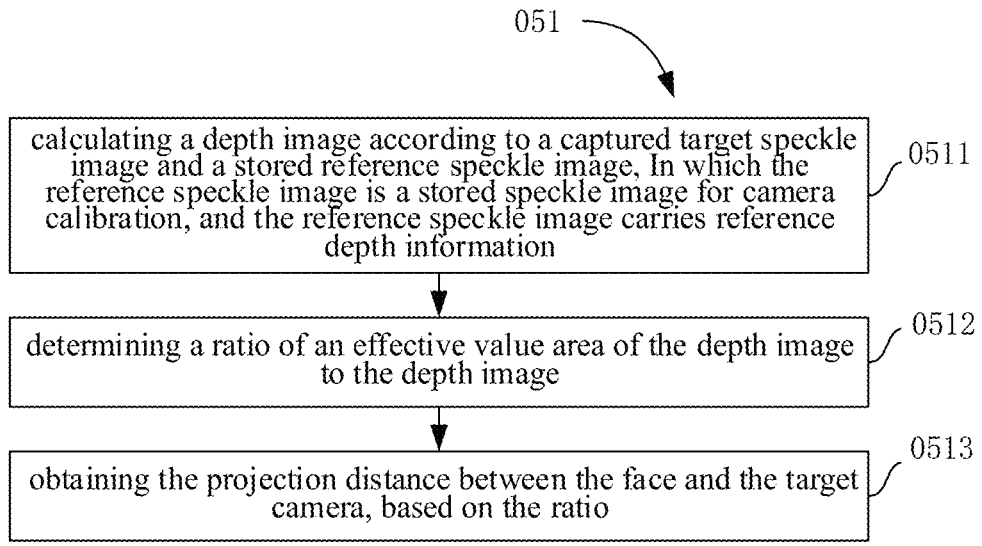
FIG. 17 is a schematic flowchart illustrating a control method according to some embodiments of the present disclosure.

As illustrated in FIG. 17, in some implementations, the block 051 includes the following.

At block 0511, a depth image is calculated according to a captured target speckle image and a stored reference speckle image. The reference speckle image is a stored speckle image for calibrating the camera. The reference speckle image carries reference depth information.

At block 0512, a ratio of an effective value region of the depth image to the depth image is determined.

At block 0513, the projection distance between the face and the target camera is obtained according to the ratio.

Further, after the block 0513, the control method further includes obtaining the projection distance between the face and the target camera collected by the distance sensor, when the projection distance obtained according to the ratio is less than the first distance threshold.

In detail, for the block 0511, the target image captured by the target camera may include the target speckle image. The terminal 100 may obtain the captured target speckle image and the reference speckle image, and compare the target speckle image with the reference speckle image to obtain the depth image. Therefore, the depth information of the face can be obtained from the depth image. The terminal 100 may select a pixel block centered on each pixel point contained in the target speckle image and having a preset size, for example, the size of 31×31 pixels, and search for a pixel block from the reference speckle image and matching the selected pixel block. The terminal 100 can find two points, respectively from the target speckle image and the reference speckle image, that are on a same laser light path and contained in the selected pixel block of the target speckle image and contained in the matching pixel block of the reference speckle image. Speckle information of the two points on the same laser light path is identical to each other. The two points on the same laser light path can be identified as corresponding pixels. The terminal 100 may calculate an offset between the two corresponding pixels that are respectively from the target speckle image and the reference speckle image on the same laser light path. The terminal 100 may obtain the depth information of each pixel point contained in the target speckle image according to the offset value, so as to obtain the depth image including the depth information of each pixel point of the target speckle image.

In an example, the terminal 100 calculates the offset value between the target speckle image and the reference speckle image and obtains the depth information of each pixel point included in the target speckle image according to the offset value. The calculating may be according to equation (1):

$$Z_D = \frac{L \times f \times Z_0}{L \times f + Z_0 \times P} \qquad (1)$$

where $Z_D$ is the depth information of the pixel point, i.e., the depth value of the pixel point, L is the distance between the laser camera 61 and the laser projector 30 (i.e., the laser 64), f is a focal length of the lens of the laser camera 61, $Z_D$ is a depth value from a reference plane and the laser camera 61 of the terminal 100 when the reference speckle image is captured, and P is a offset value between corresponding pixels respectively contained in the target speckle image and the reference speckle image. P can be obtained by multiplying the offset value between the target speckle image and the reference speckle image by an actual distance of a single pixel point. When the distance between a target object and the laser camera 61 is greater than the distance between the reference plane and the laser camera 61, P is negative. When the distance between the target object and the laser camera 61 is smaller than the distance between the reference plane and the laser camera 61, P is positive.

For the block 0512, the terminal 100 may determine the projection distance between the face and the target camera according to the depth value of each pixel point in the depth image. The terminal 100 may perform face identification on the target speckle image to determine a face region and may extract the depth value of each pixel point included in the face region. The terminal 100 may calculate an average depth value of the face region and determine the projection distance between the face and the target camera according to the average depth value. For example, When the average depth value of the face region is 50 cm, it may be determined that the projection distance between the face and the target camera is about 50 cm. For example, the terminal 100 may also select a pixel block in middle of the target speckle image. For example, a pixel block of a size of 25×25 pixels in the middle is selected and the average depth value of that pixel block is calculated. The average depth value of the pixel block may be used as the projection distance between the face and the target camera.

The terminal 100 can detect the effective value region of the depth image. The effective value region refers to a region occupied by pixel points having a depth value greater than a preset effective value. The effective value can be set according to practical requirements. The terminal 100 may determine a ratio of the effective value region of the depth image to the depth image and obtain the projection distance between the face and the target camera according to the ratio. When the projection distance between the face and the target camera is too small, in the depth image, pixel points of the face may have no depth value or have small depth values.

The terminal 100 may establish a correspondence between the ratio of the effective value region of the depth image to the depth image and the projection distance and may transform the ratio of the effective value region of the depth image to the depth image into the projection distance between the face and the target camera according to the correspondence. For example, the ratio of the effective value region of the depth map to the depth image is about 80%, and the corresponding projection distance is about 20 cm. When the ratio of the effective value region of the depth image to the depth image is less than 80%, it may be determined that the projection distance between the face and the target camera is less than 20 cm. When the ratio of the effective value region of the depth image to the depth image is 100%, the projection distance between the face and the target camera can be directly determined according to the depth value of each pixel point in the depth image.

For the block 0513, in one example, the terminal 100 may be provided with a distance sensor. The projection distance between the face and the target camera may be collected by the distance sensor. The terminal 100 may calculate the depth information of the face according to the target speckle image captured by the target camera and determine the projection distance between the face and the target camera according to the depth information. When the projection distance between the face and the target camera is less than the first distance threshold, the terminal 100 may obtain the projection distance between the face and the target camera collected by the distance sensor. The projection distance may be calculated initially based on the depth information. When the projection distance from the face is relatively short, the projection distance may be obtained again through the distance sensor. Therefore, the projection distance between the face and the target camera can be obtained accurately.

The embodiment illustrated as FIG. 17 can accurately calculate the projection distance between the face and the target camera, so that the capturing frame rate of the target camera and/or the transmission power of the laser projector 30 can be dynamically adjusted with changes in the distance, thereby protecting security of the human eyes.

It should be understood that, although blocks in the flowcharts illustrated as FIGS. 16 and 17 are sequentially displayed as indicated by the arrows, these blocks are not necessarily performed in the order indicated by the arrows. Unless specified explicitly, the execution of these blocks is not strictly limited in sequence, and the blocks may be performed in other orders. Moreover, at least a part of the blocks in the schematic flowcharts above may include multiple sub-steps or multiple stages, which are not necessarily performed at a same time and may be executed at different times. The order of these sub-steps or stages is not necessarily performed sequentially, and may be performed alternately with at least a portion of other steps, sub-steps or stages of other steps.

The present disclosure further provides a control device 10 of a camera module 60. The control method described above according to the present disclosure may be implemented by the control device 10 of the present disclosure.

Figure 18:
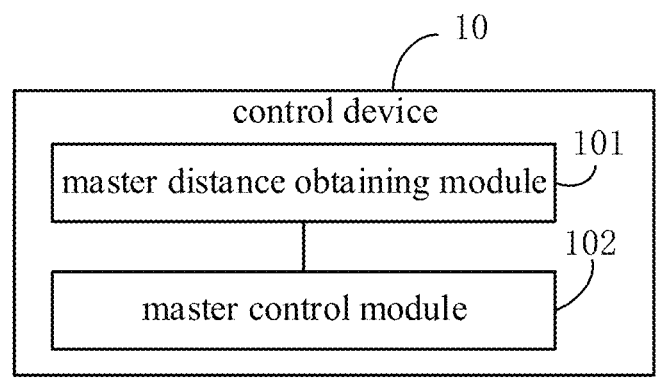
FIG. 18 is a schematic block diagram illustrating a control device according to some embodiments of the present disclosure.

As illustrated in FIG. 18, the present disclosure further provides a control device 10 of a camera module 60. The control method according to the present disclosure can be implemented by the control device 10 of the present disclosure. The control device 10 includes a master distance obtaining module 101 and a master control module 102. The block 001 may be implemented by the master distance obtaining module 101. The block 002 may be implemented by the master control module 102. That is, the master distance obtaining module 101 may be configured to obtain a projection distance between a target user and the camera module 60. The master control module 102 may be configured to determine a control parameter of the camera module 60 based on the projection distance and to control the camera module 60 based on the control parameter.

Figure 19:
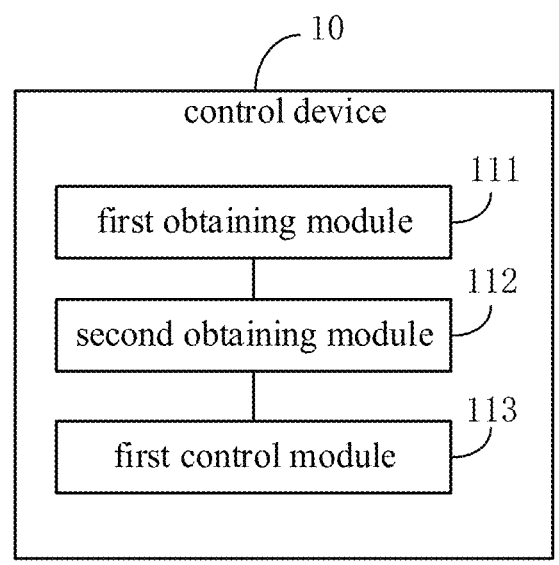
FIG. 19 is a schematic block diagram illustrating a control device according to some embodiments of the present disclosure.

As illustrated in FIG. 19, in some implementations, the master distance obtaining module 101 includes a first obtaining module 111 and a second obtaining module 112. The master control module 102 includes a first control module 113. The block 011 may be implemented by the first obtaining module 111. The block 012 may be implemented by the second obtaining module 112. The block 013 may be implemented by the first control module 113. That is, the first obtaining module 111 may be configured to obtain a facial image of the target user captured with the preset parameter. The second obtaining module 112 may be configured to obtain a projection distance between the target user and a laser projector 30 according to the facial image. The first control module 113 may be configured to control the laser projector 30 to emit laser light with corresponding projection power according to the projection distance.

Figure 20:
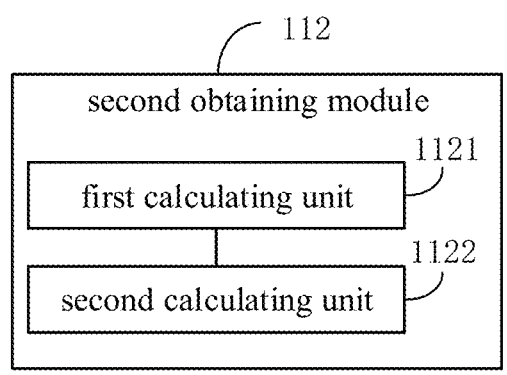
FIG. 20 is a schematic block diagram illustrating a second obtaining module of a control device according to some embodiments of the present disclosure.

As illustrated in FIG. 20, in some implementations, the second obtaining module 112 includes a first calculating unit 1121 and a second calculating unit 1122. The block 0121 may be implemented by the first calculating unit 1121. The block 0122 may be implemented by the second calculating unit 1122. That is, the first calculating unit 1121 may be configured to calculate a first ratio of the face to the facial image. The second calculating unit 1122 may be configured to calculate the projection distance based on the first ratio.

Figure 21:
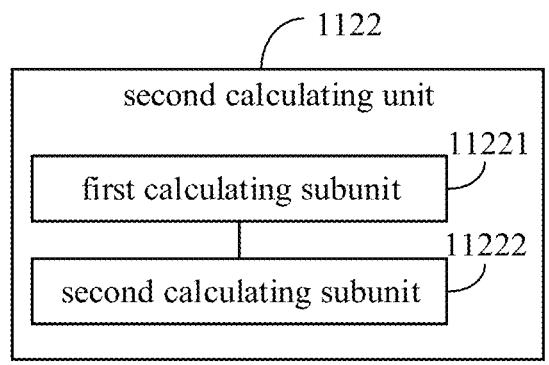
FIG. 21 is a schematic block diagram illustrating a second calculating unit of a control device according to some embodiments of the present disclosure.

As illustrated in FIG. 21, in some implementations, the second calculating unit 1122 includes a first calculating subunit 11221 and a second calculating subunit 11222. The block 01221 may be implemented by the first calculating subunit 11221. The block 01222 may be implemented by the second calculating subunit 11222. That is, the first calculating subunit 11221 is configured to calculate a second ratio of a preset feature region of the face to the face contained in the facial image. The second calculating subunit 11222 is configured to calculate the projection distance based on the first ratio and the second ratio.

Figure 22:
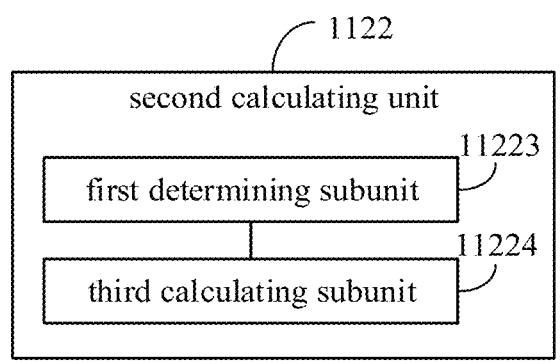
FIG. 22 is a schematic block diagram illustrating a second calculating unit of a control device according to some embodiments of the present disclosure.

As illustrated in FIG. 22, in some implementations, the second calculating unit 1122 includes a first determining subunit 11223 and a third calculating subunit 11224. The first determining subunit 11223 may be configured to implement the block 01223. The third calculating subunit 11224 may be configured to implement the block 01224. That is, the first determining subunit 11223 may be configured to determine whether the target user wears glasses according to the facial image. The third calculating subunit 11224 may be configured to calculate the projection distance based on the first ratio and a preset distance coefficient, when the target user wears the glasses.

Figure 23:
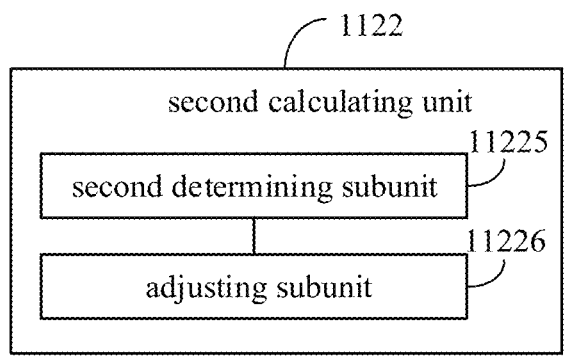
FIG. 23 is a schematic block diagram illustrating a second calculating unit of a control device according to some embodiments of the present disclosure.

As illustrated in FIG. 23, in some implementations, the second calculating unit 1122 includes a second determining subunit 11225 and an adjusting subunit 11226. The second determining subunit 11225 may be configured to implement the block 01225. The adjusting subunit 11226 may be configured to implement the block 01225. That is, the second determining subunit 11225 may be configured to determine an age of the target user according to the facial image. The adjusting subunit 11226 may be configured to adjust the projection distance according to the first ratio and the age.

Figure 24:
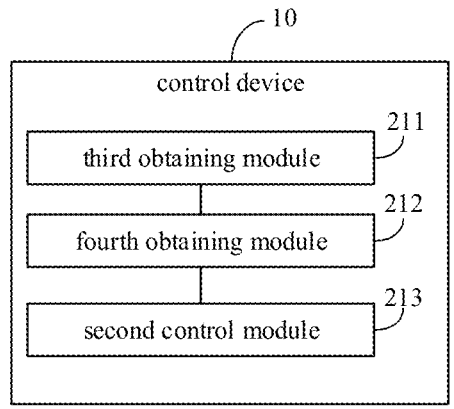
FIG. 24 is a schematic block diagram illustrating a control device according to some embodiments of the present disclosure.

As illustrated in FIG. 24, in some implementations, the master distance obtaining module 101 includes a third obtaining module 211, a fourth obtaining module 212 and a second control module 213. The block 021 may be implemented by the third obtaining module 211. The block 022 may be implemented by the fourth obtaining module 212. The block 023 may be implemented by the second control module 213. That is, the third obtaining module 211 may be configured to obtain a projection distance between the target user and a laser projector 30. The fourth obtaining module 212 may be configured to obtain projection power corresponding to the laser projector 30 according to the projection distance. The second control module 213 may be configured to control the laser projector 30 to emit laser light with the projection power.

Figure 25:
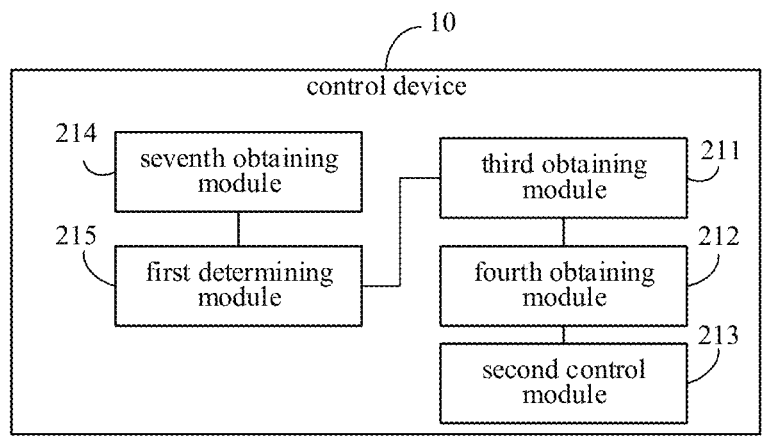
FIG. 25 is a schematic block diagram illustrating a control device according to some embodiments of the present disclosure.

As illustrated in FIG. 25, in some implementations, the control device 10 further includes a seventh obtaining module 214 and a first determining module 215. The seventh obtaining module 214 may be configured to implement the block 024. The first determining module 215 may be configured to implement the block 025. That is, the seventh obtaining module 214 may be configured to obtain a scene image of a target scene. The first determining module 215 may be configured to determine whether a face exists in the scene image. When the face is exists in the scene image, the third obtaining module 211 is configured to obtain the projection distance between the target user and the laser projector 30.

Figure 26:
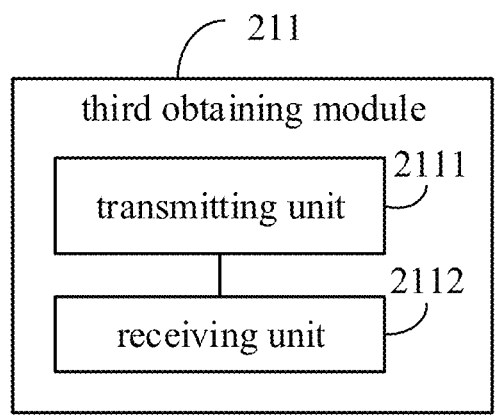
FIG. 26 is a schematic block diagram illustrating a third obtaining module of a control device according to some embodiments of the present disclosure.

As illustrated in FIG. 26, in some implementations, the third obtaining module 211 includes a transmitting unit 2111 and a receiving unit 2112. The transmitting unit 2111 may be configured to implement the block 0211. The receiving unit 2112 may be configured to implement the block 0212. That is, the transmitting unit 2111 may be configured to transmit a detection signal to the target user. The receiving unit 2112 may be configured to calculate the projection distance based on a detection signal reflected by the target user.

Figure 27:
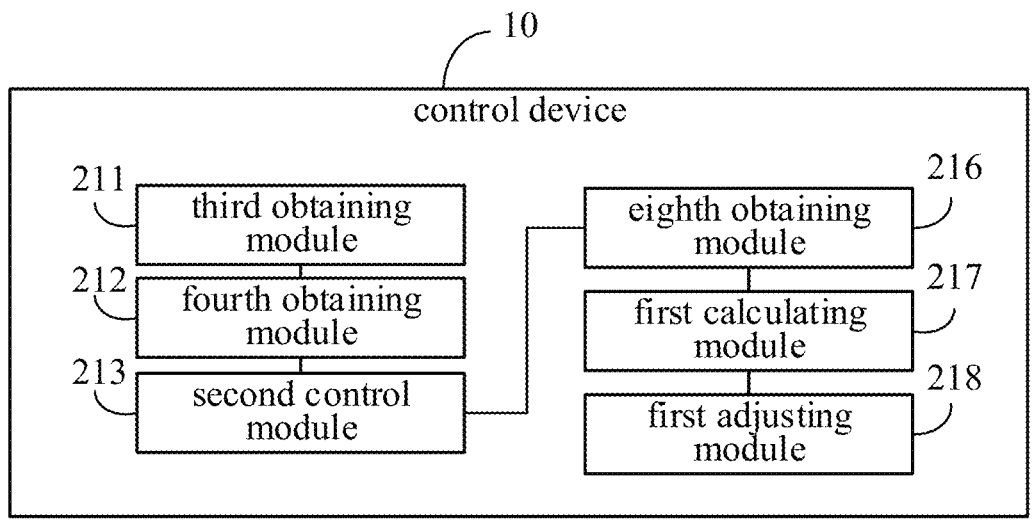
FIG. 27 is a schematic block diagram illustrating a control device according to some embodiments of the present disclosure.

As illustrated in FIG. 27, in some implementations, the control device 10 further includes an eighth obtaining module 216, a first calculating module 217 and a first adjusting module 218. The third obtaining module 16 may be configured to implement the block 026. The first calculating module 27 may be configured to implement the block 027. The first adjusting module 218 may be configured to implement the block 028. That is, the eighth obtaining module 216 may be configured to obtain a captured image of the target user. The first calculating module 217 may be configured to calculate an age of the target user according to the captured image. The first adjusting module 218 may be configured to adjust the projection power of the laser projector 30 according to the age.

Figure 28:
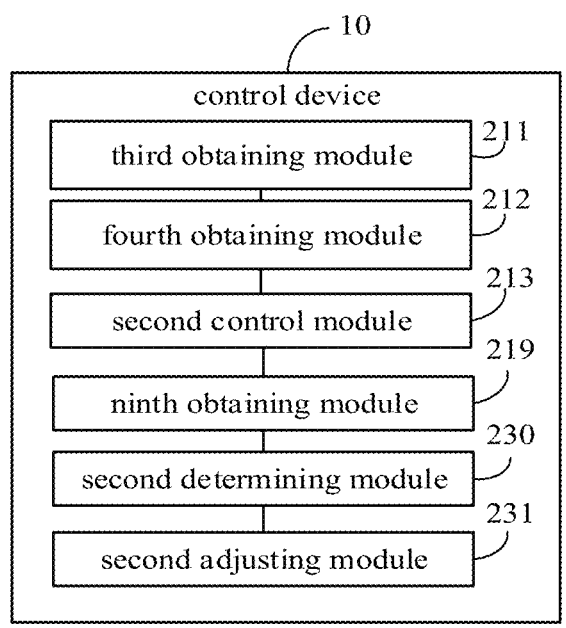
FIG. 28 is a schematic block diagram illustrating a control device according to some embodiments of the present disclosure.

As illustrated in FIG. 28, in some implementations, the control device 10 further includes a ninth obtaining module 219, a second determining module 230 and a second adjusting module 231. The ninth obtaining module 219 may be configured to implement the block 029. The second determining module 230 may be configured to implement the block 030. The second adjusting module 231 may be configured to implement the block 031. That is, the ninth obtaining module 219 may be configured to obtain a captured image of the target user. The second determining module 230 may be configured to determine whether the target user wears glasses according to the captured image. The second adjusting module 231 may be configured to reduce the projection power of the laser projector 30, when the user wears the glasses.

Figure 29:
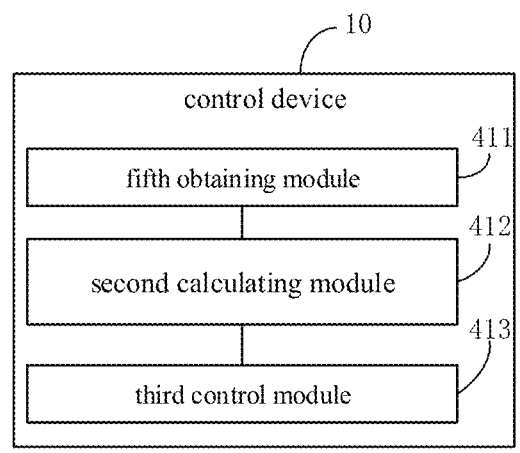
FIG. 29 is a schematic block diagram illustrating a control device according to some embodiments of the present disclosure.

As illustrated in FIG. 29, in some implementations, the master distance obtaining module 101 includes a fifth obtaining module 411. The master control module 102 includes a second calculating module 412 and a third control module 413. The block 041 may be implemented by the fifth obtaining module 411. The block 042 may be implemented by the second calculating module 412. The block 043 may be implemented by the third control module 413. That is, the fifth obtaining module 411 may be configured to obtain the projection distance between the target user and the laser projector 30. The second calculating module 412 may be configured to obtain an energy density when the laser projector 30 at a current distance emits the laser light with a preset parameter, according to the projection distance. The third control module 413 may configured to adjust the preset parameter according to the energy density and a safety energy threshold and to control the laser projector 30 based on the adjusted preset parameter.

Figure 30:
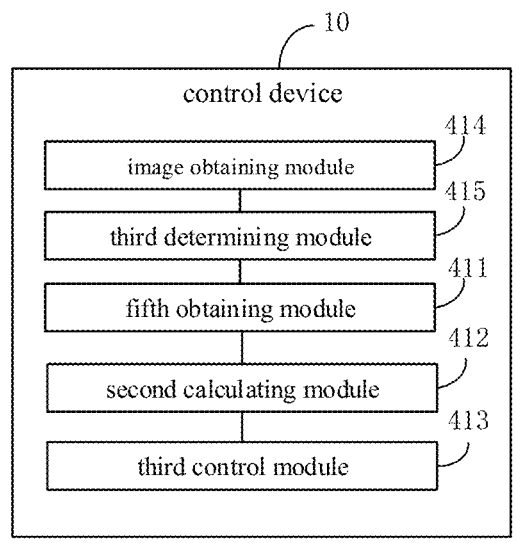
FIG. 30 is a schematic block diagram illustrating a control device according to some embodiments of the present disclosure.

As illustrated in FIG. 30, in some implementations, the control device 10 further includes an image obtaining module 414 and a third determining module 415. The block 044 may be implemented by the image obtaining module 414. The block 045 may be implemented by the third determining module 415. The block 046 may be implemented by the fifth obtaining module 411. That is, the image obtaining module 414 is configured to obtain a scene image of a target scene. The third determining module 415 is configured to determine whether a face exists in the scene image. The fifth obtaining module 411 is configured to obtain the projection distance between the target user and the laser projector 30, when the face exists in the scene image.

Figure 31:
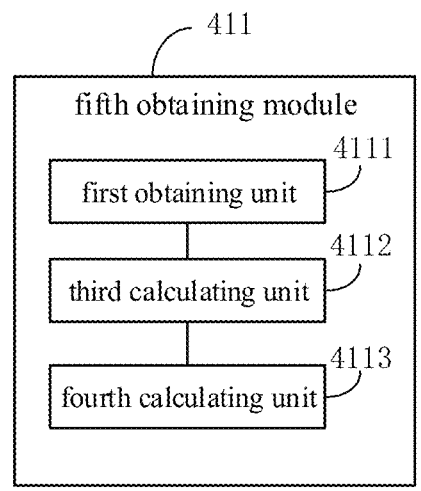
FIG. 31 is a schematic block diagram illustrating a fifth obtaining module of a control device according to some embodiments of the present disclosure.

As illustrated in FIG. 31, in some implementations, the fifth obtaining module 411 includes a first obtaining unit 4111, a third calculating unit 4112 and a fourth calculating unit 4113. The block 0411 can be implemented by the first obtaining unit 4111. The block 0412 can be implemented by the third calculating unit 4112. The block 0413 can be implemented by the fourth calculating unit 4113. That is, the first obtaining unit 4111 may be configured to obtain a facial image of a target user captured with the preset parameter. The third calculating unit 4112 may be configured to calculate a ratio of a face to the facial image. The fourth calculating unit 4113 may be configured to calculate a projection distance based on the ratio.

Figure 32:
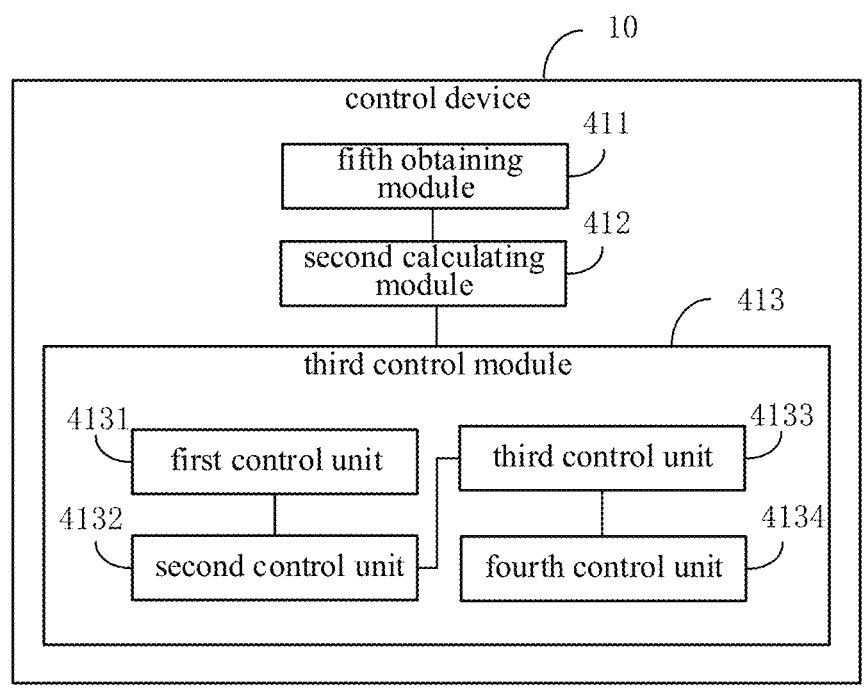
FIG. 32 is a schematic block diagram illustrating a control device according to some embodiments of the present disclosure.

As illustrated in FIG. 32, in some implementations, the third control module 413 includes a first control unit 4131. The block 0431 can be implemented by the first control unit 4131. That is, the first control unit 4131 is configured to reduce the projection power of the laser projector 30 when the energy density is greater than the safety energy threshold.

As illustrated in FIG. 32, in some implementations, the third control module 413 includes a second control unit 4132. The block 0432 may be implemented by the second control unit 4132. That is, the second control unit 4132 is configured to reduce a projection frequency of the laser projector 30 when the energy density is greater than the safety energy threshold.

As illustrated in FIG. 32, in some implementations, the third control module 413 includes a second control unit 4133. The block 0433 may be implemented by the second control unit 4133. That is, the second control unit 4133 is configured to reduce a pulse width of the laser light projected by the laser projector 30, when the energy density is greater than the safe energy threshold.

As illustrated in FIG. 32, in some implementations, the third control module 413 includes a fourth control unit 4134. The block 0434 can be implemented by the fourth control unit 4134. That is, the fourth control unit 4134 is configured to control the laser projector 30 to turn off, when the projection distance is greater than a safety distance threshold.

Figure 33:
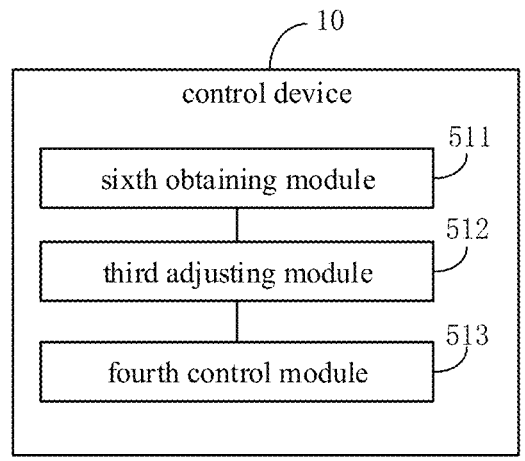
FIG. 33 is a schematic block diagram illustrating a control device according to some embodiments of the present disclosure.

As illustrated in FIG. 33, in some implementations, the control device 10 further includes a sixth obtaining module 511, a third adjusting module 512 and a fourth control module 513. The block 051 can be implemented by the sixth obtaining module 511. The block 052 can be implemented by third adjusting module 512. The block 053 can be implemented by the fourth control module 513. That is, the sixth obtaining module 511 is configured to obtain a projection distance between a face of the target user and the target camera at a preset time interval, when the target camera is on. The third adjusting module 512 is configured to adjust the capturing frame rate of the target camera and/or the transmission power of the laser projector 30 according to the projection distance. The fourth control module 513 is configured to control the laser projector 30 to emit the laser light with the transmission power, and control the target camera to capture the target image at the capturing frame rate.

In some implementations, the third adjusting module 512 is further configured to reduce the capturing frame rate of the target camera when the projection distance is less than a first distance threshold and greater than a second distance threshold.

In some implementations, the third adjusting module 512 is further configured to reduce the capturing frame rate of the target camera and the transmission power of the laser projector 30, when the projection distance is less than or equal to the second distance threshold, to reduce a driving current of the laser projector 30 to a preset percentage of a rated driving current, when the projection distance is less than or equal to the second distance threshold and greater than a third distance threshold, and to reduce the driving current of the laser projector 30 to be less than a current threshold, when the projection distance is less than or equal to the third distance threshold. The current threshold is less than the preset percentage of the rated driving current.

In some implementations, the third adjusting module 512 is further configured to recover the capturing frame rate of the target camera to a standard frame rate and recover the transmission power of the laser projector 30 to the rated power, when the projection distance is greater than or equal to the first distance threshold.

Figure 34:
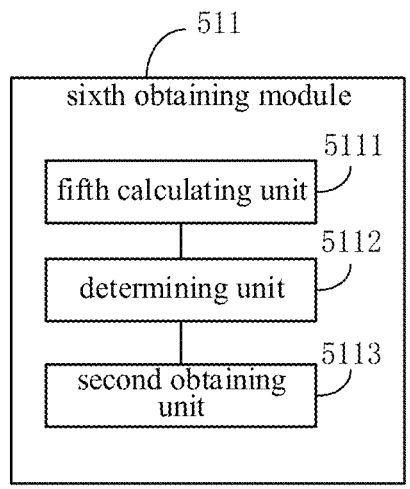
FIG. 34 is a schematic block diagram illustrating a sixth obtaining module of a control device according to some embodiments of the present disclosure.

As illustrated in FIG. 34, in some implementations, the sixth obtaining module 511 includes a fifth calculating unit 5111, a determining unit 5112 and a second obtaining unit 5113. The block 0511 can be implemented by the fifth calculating unit 5111. The block 0512 can be implemented by the determining unit 5112. The block 0513 can be implemented by the second obtaining unit 5113. That is, the fifth calculating unit 5111 may be configured to calculate a depth image according to a captured target speckle image and a stored reference speckle image. The reference speckle image is a stored speckle image for calibrating the camera. The reference speckle image carries reference depth information. The determining unit 5112 may be configured to determine a ratio of an effective value region of the depth image to the depth image. The second obtaining unit 5113 may be configured to obtain the projection distance between the face and the target camera according to the ratio. The sixth obtaining module 511 is further configured to obtain the projection distance between the face and the target camera collected by the distance sensor, when the projection distance obtained according to the ratio is less than the first distance threshold.

The present disclosure further provides a terminal 100.

Figure 35:
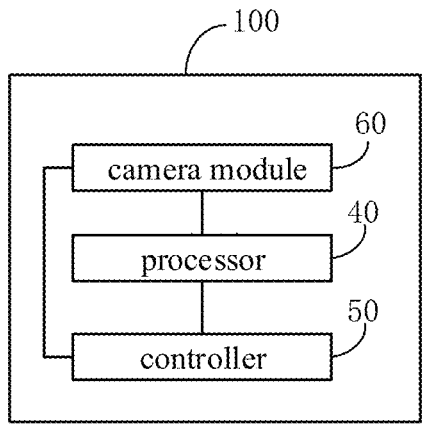
FIG. 35 is a schematic block diagram illustrating a terminal according to some embodiments of the present disclosure.

As illustrated in FIG. 35, the present disclosure further provides a terminal 100. The control method of the present disclosure may also be implemented by the terminal 100 of the present disclosure. The terminal includes a camera module 60, a processor 40 and a controller 50. The block 001 may be implemented by the processor 40. The block 002 may be implemented by the processor 40 and the controller 50 together. That is, the processor 40 is configured to obtain the projection distance between the target user and the camera module 60 and to determine the control parameter of the camera module 60 according to the projection distance. The controller 50 is configured to control the camera module 60 based on the control parameter.

Figure 36:
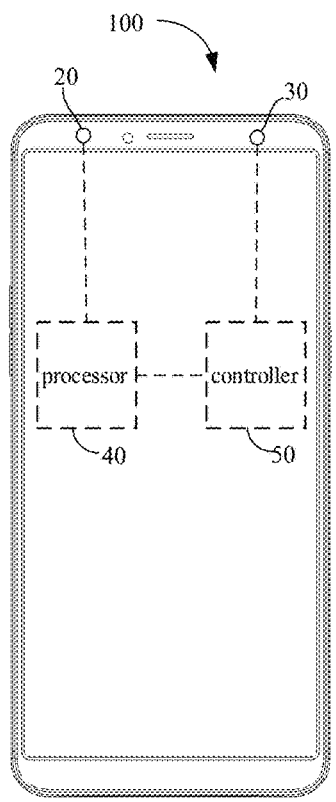
FIG. 36 is a schematic block diagram illustrating a terminal according to some embodiments of the present disclosure.

As illustrated in FIG. 36, in some implementations, the terminal 100 includes an image capturing device 20. The camera module 60 includes a laser projector 30. The image capturing device 20 may be configured to capture a facial image of the target user with a preset parameter. The block 011 and the block 012 may be implemented by a processor 40. The block 013 may be implemented by a controller 50.

That is, the processor 40 may be configured to obtain a facial image of the target user captured by the image capturing device 20 with a preset parameter and to obtain a projection distance between the target user and the laser projector 30 according to the facial image. The controller 50 may be configured to control the laser projector 30 to emit laser light with corresponding projection power according to the projection distance.

As illustrated in FIG. 36, in some implementations, the processor 40 may be further configured to implement the block 0121 and the block 0122. That is, the processor 40 may be configured to calculate a first ratio of the face in the facial image and calculate the projection distance based on the first ratio.

As illustrated in FIG. 36, in some implementations, the block 01221 and the block 01222 may also be implemented by the processor 40. That is, the processor 40 is further configured to calculate a second ratio of a preset feature region of the face to the face contained in the facial image, and to calculate the projection distance based on the first ratio and the second ratio.

As illustrated in FIG. 36, in some implementations, the processor 40 is further configured to implement the block 01223 and the block 01224. That is, the processor 40 is further configured to determine whether the target user wears glasses according to the facial image, and to calculate the projection distance based on the first ratio and a preset distance coefficient, when the target user wears the glasses.

As illustrated in FIG. 36, in some implementations, the processor may be further configured to implement the block 01225 and the block 01226. That is, the processor 40 is further configured to determine an age of the target user according to the facial image, and adjust the projection distance according to the first ratio and the age.

Figure 37:
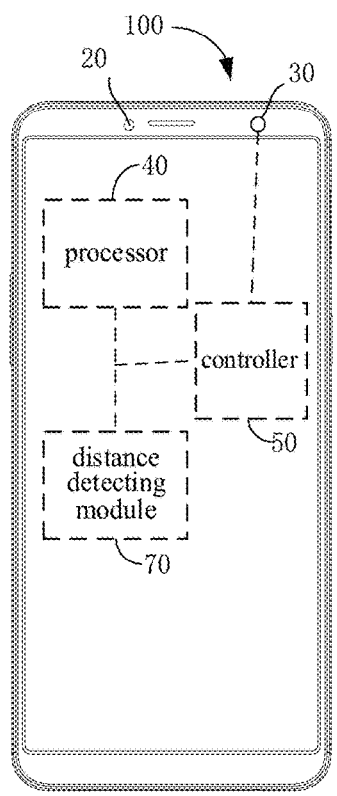
FIG. 37 is a schematic block diagram illustrating a terminal according to some embodiments of the present disclosure.

As illustrated in FIG. 37, in some implementations, the terminal 100 further includes a distance detecting module 70. The distance detecting module 70 may be configured to implement the block 021. The processor 40 may be configured to implement the block 022. The controller 50 may be configured to implement the block 023. That is, the distance detecting module 70 may be configured to obtain a projection distance between the target user and a laser projector 30. The processor 40 may be configured to obtain projection power corresponding to the laser projector 30 according to the projection distance. The controller 50 may be configured to control the laser projector 30 to emit laser light with the projection power.

As illustrated in FIG. 37, in some implementations, the terminal 100 further includes the image capturing device 20. The image capturing device 20 may be configured to capture a scene image of a target scene. The processor 40 may be further configured to implement the block 024 and the block 025. That is, the processor 40 may be configured to obtain a scene image of a target scene and determine whether a face exists in the scene image. In detail, the processor 40 may be configured to obtain the scene image of the target scene captured by the image capturing device 20. When it is determined by the processor 40 that a face exists in the scene image, the distance detecting module 70 is configured to obtain the projection distance between the target user and the laser projector 30.

Figure 38:
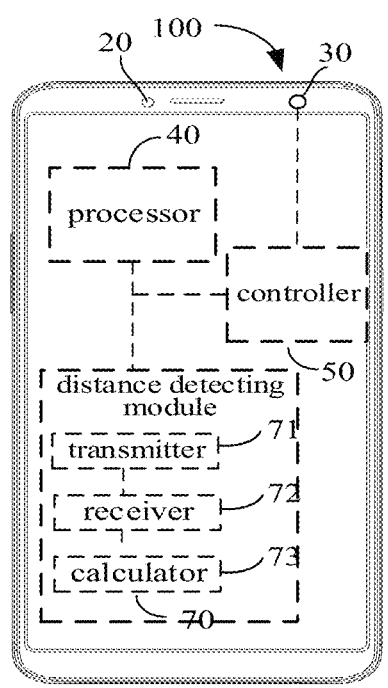
FIG. 38 is a schematic block diagram illustrating a terminal according to some embodiments of the present disclosure.

As illustrated in FIG. 38, in some implementations, the distance detecting module 70 includes a transmitter 71, a receiver 72 and a calculator 73. The transmitter 71 may be configured to implement the block 0211. The receiver 72 and the calculator 73 may be configured to implement the block 0212 together. That is, the transmitter 81 may be configured to transmit a detection signal to the target user. The receiver 72 may be configured to receive a detection signal reflected by the target user. The calculator 73 may be configured to calculate the projection distance based on the detection signal reflected by the target user.

As illustrated in FIG. 38, in some implementations, the terminal 100 further includes the image capturing device 20. The image capturing device 20 may be configured to implement the block 026. The processor 40 may also be configured to implement the block 027 and the block 028. That is, the image capturing device 20 may be further configured to obtain a captured image of the target user. The processor 40 may be further configured to calculate an age of the target user according to the captured image, and adjust the projection power of the laser projector 30 according to the age.

As illustrated in FIG. 38, in some implementations, the terminal 100 further includes the image capturing device 20. The image capturing device 20 may be configured to implement the block 029. The processor 40 may also be configured to implement the blocks 030 and 031. That is, the image capturing device 20 may be configured to obtain a captured image of the target user. The processor 40 may be configured to determine whether the target user wears the glasses according to the captured image, and to reduce the projection power of the laser projector 30 when the user wears the glasses.

As illustrated in FIG. 36, in some implementations, the block 041 and the block 042 may be implemented by the processor 40. The block 043 may be implemented by the controller 50. That is, the processor 40 may be configured to obtain the projection distance between the target user and the laser projector 30, and to obtain an energy density when the laser projector 30 at a current distance emits the laser light with a preset parameter, according to the projection distance. The controller 50 may be configured to adjust the preset parameter according to the energy density and a safety energy threshold and to control the laser projector 30 based on the adjusted preset parameter.

As illustrated in FIG. 36, in some implementations, the image capturing device 20 of the terminal 100 is configured to implement the block 044. The processor 40 is configured to implement the block 045 and the block 046. That is, the image capturing device 20 is configured to obtain a scene image of a target scene. The processor 40 is configured to determine whether a face exists in the scene image and to obtain the projection distance between the target user and the laser projector 30, when the face exists in the scene image.

As illustrated in FIG. 36, in some implementations, the processor 40 may be also configured to implement the block 0411, the block 0412, and the block 0413. That is, the processor 40 may be configured to obtain a facial image of a target user captured by the image capturing device 20 with a preset parameter, to calculate a ratio of a face to the facial image, and to calculate a projection distance based on the ratio.

As illustrated in FIG. 36, in some implementations, the controller 50 is configured to reduce the projected power of the laser projector 30 when the energy density is greater than the safe energy threshold.

As illustrated in FIG. 36, in some implementations, the controller 50 is configured to reduce a projection frequency of the laser projector 30 when the energy density is greater than the safe energy threshold.

As illustrated in FIG. 36, in some implementations, the controller 50 is configured to reduce a pulse width of the laser light projected by the laser projector 30, when the energy density is greater than the safe energy threshold.

As illustrated in FIG. 36, in some implementations, the controller 50 is configured to control the laser projector 30 to turn off, when the projection distance is less than a safety distance threshold.

Figure 39:
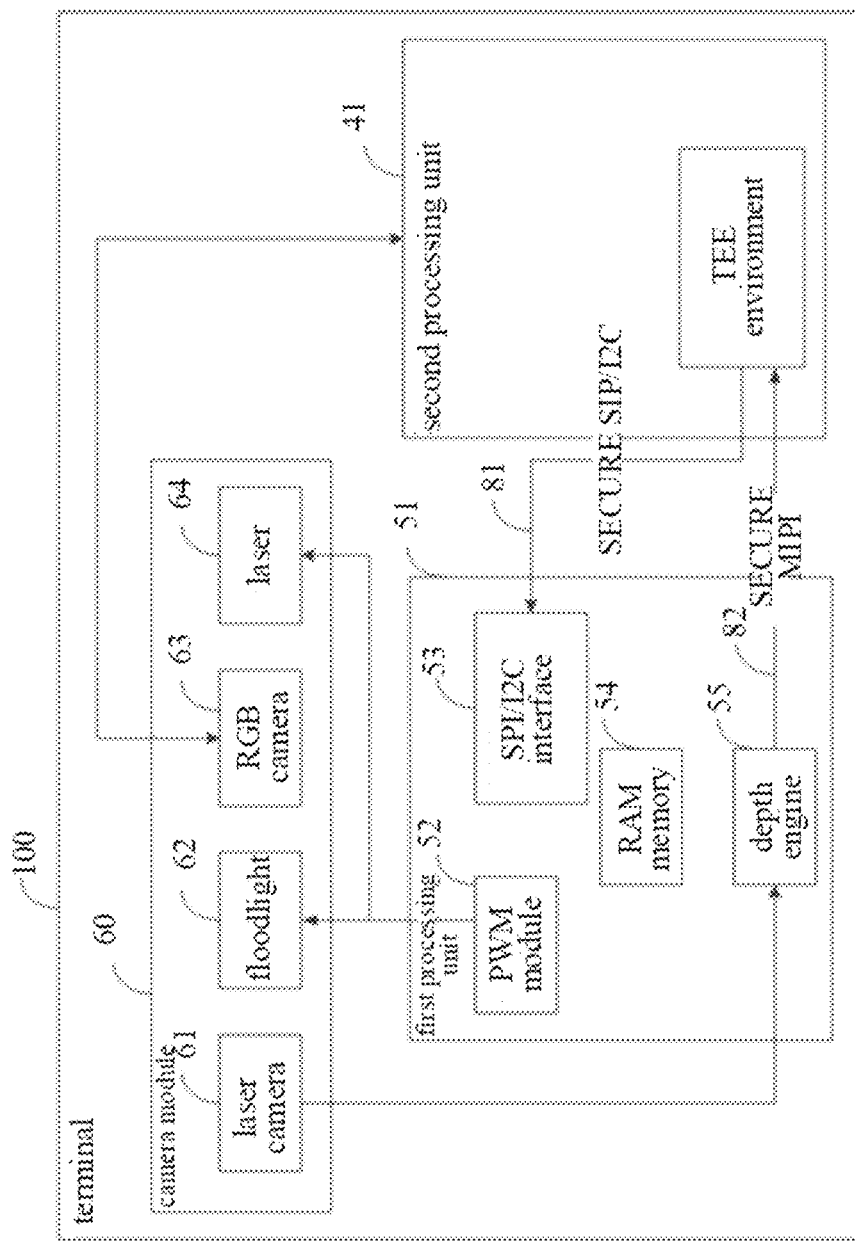
FIG. 39 is a diagram illustrating an application scenario of a control method according to some embodiments of the present disclosure.

As illustrated in FIG. 39, the processor 40 serves as a second processing unit. The controller 50 serves as the first processing unit. In detail, the terminal 100 includes a camera module 60, the second processing unit 41 and the first processing unit 51. The camera module 60 includes a laser camera 61 (i.e., the target camera), a floodlight 62, an RGB (red/green/blue color mode) camera 63, and a laser 64 (i.e., the laser projector 30). The second processing unit 41 can be a CPU (central processing unit) module. The first processing unit 51 can be an MCU (microcontroller unit) module or the like. The first processing unit 51 is coupled between the second processing unit 41 and the camera module 60. The first processing unit 51 may be configured to control the laser camera 61, the floodlight 62 and the laser 64. The second processing unit 41 may be configured to control the RGB camera 63.

The laser camera 61 may be an infrared camera for obtaining an infrared image. The floodlight 62 is an area light source capable of emitting the infrared light. The laser 64 is a point light source capable of emitting the laser light that may form a pattern. When the floodlight 62 emits the infrared light, the laser camera 61 may obtain an infrared image according to reflected light. When the laser 64 emits the laser light, the laser camera 61 may obtain a speckle image according to reflected light. The speckle image is an image having a pattern that is deformed compared to the pattern formed by the laser light emitted by the laser 64 after the laser light is reflected.

The second processing unit 51 may include a CPU core running in TEE (trusted execution environment) and a CPU core running in REE (rich execution environment). Both the TEE and the REE are operating modes of an ARM (advanced reduced instruction set computer (RISC) machines) module. A security level of the TEE is relatively high. There may be one and only one CPU core of the second processing unit 41 may run in the TEE simultaneously. Generally, an operation behavior of the high security level on the terminal 100 needs to be performed in the CPU core under the TEE, and an operation behavior of the low security level may be performed in the CPU core under the REE.

The first processing unit 51 includes a PWM (pulse width modulation) module 52, a SPI/I2C (serial peripheral interface/inter-integrated circuit) interface 53, a RAM (random access memory) module 54, and a depth engine 55. The PWM module 52 may emit a pulse to the camera module 60, to control the floodlight 62 or the laser 64 to turn on, so that the laser camera 61 may capture an infrared image or a speckle image. The SPI/I2C interface 53 is configured to receive a face capturing command sent by the second processing unit 41. The depth engine 55 may be configured to process the speckle image to obtain a depth disparity map.

When the second processing unit 41 receives a data acquisition request from an application, for example, when the application needs to perform face unlocking or face payment, the CPU core running in the TEE may send the face capturing command to the first processing unit 51. After receiving the face capturing command, the first processing unit 51 may control the floodlight 62 to turn on by transmitting a pulse wave through the PWM module 52 such that the infrared image is captured by the laser camera 612 and to control the laser 64 to turn on such that the speckle image is captured by the laser camera 61. The camera module 60 may transmit the captured infrared image and speckle image to the first processing unit 51. The first processing unit 51 may process the received infrared image to obtain an infrared disparity map and process the received speckle images to obtain a speckle disparity map or a depth disparity map. Processing the infrared image and the speckle image by the first processing unit 51 refers to correcting the infrared image or the speckle image and removing influences of internal and external parameters of the camera module 60 on the images. The first processing unit 51 may be set to different modes. Images output by different modes are different. When the first processing unit 51 is set to a speckle image mode, the first processing unit 51 processes the speckle image to obtain a speckle disparity map. A target speckle image may be obtained according to the speckle disparity map. When the first processing unit 51 is set to a depth image mode, the first processing unit 51 processes the speckle image to obtain a depth disparity map. A depth image may be obtained according to the depth disparity map. The depth image refers to an image with depth information. The first processing unit 51 may send the infrared disparity map and the speckle disparity map to the second processing unit 41. The first processing unit 51 may also send the infrared disparity map and the depth disparity map to the second processing unit 41. The second processing unit 41 may obtain a target infrared image according to the infrared disparity map and obtain a depth image according to the depth disparity map. Further, the second processing unit 41 may perform face recognition, face matching, living body detection and obtain depth information of the detected face according to the target infrared image and the depth image. In another example, the first processing unit 51 may obtain the target infrared image according to the infrared disparity map, obtain the depth image through calculation according to the depth disparity map, and send the target infrared image and the depth image to the second processing unit 41. Communication between the first processing unit 51 and the second processing unit 41 is done through a fixed security interface to ensure security of data transmission. As illustrated in FIG. 39, the transmission of the data from the second processing unit 41 to the first processing unit 51 is done through the SECURE SPI/I2C 81, and the transmission of the data from the first processing unit 51 to the second processing unit 41 is done through the SECURE MIPI (mobile industry processor interface) 82.

The block 051 and the block 052 may be implemented by the second processing unit 41. The block 053 may be implemented by the first processing unit. That is, the second processing unit 41 may be configured to obtain the projection distance between a face of the target user and a target camera at a preset time interval when the target camera is on, and to adjust a capturing frame rate of the target camera and/or transmission power of the laser projector 30 according to the projection distance. The first processing unit 51 may be configured to control the laser projector 30 to emit the laser light with the transmission power and to control the target camera to capture the target image at the capturing frame rate. In detail, for the block 051, when an application of the terminal 100 needs to obtain facial data of the target user, the target camera may be controlled to turn on to capture the target image via the target camera. The target camera may refer to the laser camera 61. The laser camera 61 may capture invisible images of different wavelengths. The target image may include, but is not limited to, an infrared image and a speckle image. The speckle image refers to an infrared image having a speckle pattern. The terminal 100 may turn the floodlight 62 on such that an infrared image is captured via the laser camera 61 and may turn a laser, such as the laser 64, on such that the speckle image is captured by the laser camera 61. The floodlight 62 may be a point light source that uniformly illuminates in all directions. The light emitted by the floodlight may be infrared. The laser camera may capture an infrared image by photographing the face. The laser light emitted by the laser projector 30 (i.e., the laser 64) may be diffracted by a lens and a DOE (diffractive optical element) to produce a pattern with speckle particles. The pattern with the speckle particles are projected onto the target object and shift of the speckle image is generated due to different distances between points of the target object with the terminal 100. The laser camera 61 photographs the target object to obtain the speckle image.

In one example, when the laser camera 61 of the camera module 60 is on, the second processing unit 41 can obtain the projection distance between the face and the laser camera 61 at a preset time interval. The second processing unit 41 can adjust the capturing frame rate of the laser camera and/or the transmission power of the laser projector 30 according to the projection distance. The first processing unit 51 can control the laser 64 to emit the laser light according to the adjusted transmission power, and control the laser camera 61 to obtain the target image, such as the infrared image and the speckle image, according to the adjusted capturing frame rate.

In some implementations, the second processing unit 41 is further configured to reduce the capturing frame rate of the target camera when the projection distance is less than a first distance threshold and greater than a second distance threshold.

In some implementations, the second processing unit 41 is further configured to reduce the capturing frame rate of the target camera and the transmission power of the laser projector 30, when the projection distance is less than or equal to the second distance threshold, to reduce a driving current of the laser projector 30 to a preset percentage of a rated driving current, when the projection distance is less than or equal to the second distance threshold and greater than a third distance threshold, and to reduce the driving current of the laser projector 30 to be less than a current threshold, when the projection distance is less than or equal to the third distance threshold. The current threshold is less than the preset percentage of the rated driving current.

In some implementations, the second processing unit 41 is further configured to recover the capturing frame rate of the target camera to a standard frame rate and recover the transmission power of the laser projector 30 to the rated power, when the projection distance is greater than or equal to the first distance threshold.

As illustrated in FIG. 39, in some implementations, the terminal 100 further includes a distance sensor. The distance sensor is coupled to the second processing unit 41. The block 0511 can be implemented by the first processing unit 51 and the second processing unit 41 together. The block 0512 and the block 0513 can be implemented by the second processing unit 41. That is, the first processing unit 51 is further configured to calculate the disparity image according to a captured target speckle image and a stored reference speckle image, and transmit the disparity image to the second processing unit 41. The reference speckle image is a stored speckle image for calibrating the camera. The reference speckle image carries reference depth information. The second processing unit 41 is further configured to calculate a depth image according to the disparity image, and to determine a ratio of an effective value region of the depth image to the depth image. The second processing unit 41 is further configured to obtain the distance between the face and the target camera according to the ratio. The distance sensor is configured to collect the distance between the face and the target camera. The second processing unit 41 is further configured to obtain the projection distance between the face and the target camera collected by the distance sensor, when the projection distance obtained according to the ratio is less than the first distance threshold.

In some implementations, the second processing unit 41 is further configured to obtain a type of the application and to determine a security level corresponding to the type of the application. The application is an application for transmitting a face depth information obtaining request to the second processing unit. The second processing unit 41 is further configured to switch among operation modes according to the security level. When the security level is high, the disparity image is received in a first operation mode. The depth map is calculated according to the disparity image in the first operation mode. When the security level is low, the disparity image is received in the first operation mode, and the depth image is calculated according to the disparity image in a second operation mode.

In detail, the second processing unit 41 may be operated in two operation modes. The first operation mode may be the TEE. The TEE is a trustable operating environment with a high security level. The second operation mode may be the REE. The REE is a natural operating environment with a low security level. When the application of the terminal 100 sends the face depth information obtaining request to the second processing unit 41, the second processing unit 41 may obtain the type of the application and switch among the operation modes according to the security level corresponding to the type. The type of the application may include, but not limited to, an unlock application, a payment application, a camera application, a beauty application, and the like. Security levels corresponding to different types may be different. For example, the security level corresponding to the payment application and the unlock application may be high, and the security level corresponding to the camera application and the beauty application may be low, but the present disclosure is not limited to. When the security level corresponding to the type is high, the second processing unit 41 may be switched to operate in the first operation mode. When the security level corresponding to the type is low, the second processing unit 41 may be switched to operate in the second operation mode. For example, when the second processing unit 41 is single-core, the single core may be directly switched from the second operation mode to the first operation mode. When the second processing unit 41 is multi-core, one of the multi-core is switched by the terminal 100 from the second operation mode to the first operation mode, and other cores still operate in the second operation mode. The second processing unit 41 can transmit a face capturing command to the first processing unit 51 via the core switched to operate in the first operation mode, thereby ensuring that a command input by the first processing unit 51 is secure. The first processing unit 51 can control the laser camera 61 to obtain the target image, such as the infrared image and the speckle image through the PWM module. The first processing unit 51 may obtain the disparity image through the calculation based on the target speckle image and the reference speckle image and may send the disparity image to the core operating in the first operating mode of the second processing unit 41. When the security level of the application for transmitting the face depth information obtaining request is high, the core operating in the first operation mode of the second processing unit 41 may obtain the depth image through the calculation based on the disparity image. When the security level of the application for transmitting the face depth information obtaining request is low, the core operating in the first operation mode of the second processing unit 41 may send the disparity image to other cores operating in the second processing mode, and the depth image is obtained through the calculation by other cores operating in the second processing mode.

The present disclosure also provides a computer readable storage medium. A non-volatile computer readable storage medium includes one or more computer executable instructions. When the computer executable instructions are executed by one or more processors, the one or more processors are configured to perform the control methods of any of the above embodiments.

For example, a block 001 of obtaining a projection distance between a target user and a camera module 60 is executed. A block 002 of determining a control parameter of the camera module 60 according to the projection distance and controlling the camera module 60 based on the control parameter is executed.

For example, a block 011 of obtaining a facial image of the target user captured based on a preset parameter is executed. A block 012 of obtaining a projection distance between the target user and a laser projector 30 according to the facial image is executed. A block 013 of controlling the laser projector 30 to emit laser light with corresponding projection power according to the projection distance is executed.

For example, a block 021 of obtaining a projection distance between the target user and the laser projector 30 is executed. A block 022 of obtaining projection power corresponding to the laser projector 30 according to the projection distance is executed. A block 023 of controlling the laser projector 30 to emit the laser light with the projection power is executed.

For example, a block 041 of obtaining a projection distance between the target user and the laser projector 30 is executed. A block 042 of obtaining an energy density of the laser light emitted by the laser projector 30 with the preset parameter at a current distance, according to the projection distance is executed. A block 043 of adjusting the preset parameter according to the energy density and a security energy threshold and controlling the laser projector 30 based on the adjusted preset parameter is executed.

For example, a block 051 of obtaining the projection distance between a face of the target user and the target camera at a preset time interval when the target camera is on is executed. A block 052 of adjusting a capturing frame rate of the target camera and/or transmission power of the laser projector 30 according to the projection distance is executed. A block 053 of controlling the laser projector 30 to emit the laser light with the transmission power and controlling the target camera to capture the target image at the capturing frame rate is executed.

Figure 40:
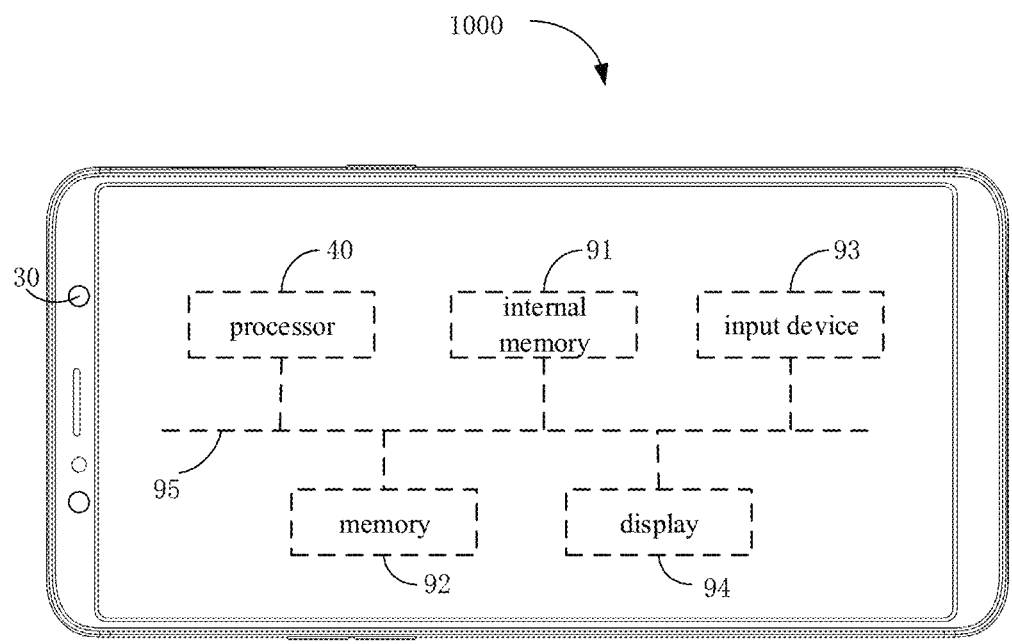
FIG. 40 is a schematic block diagram illustrating a computer device according to some embodiments of the present disclosure.
Figure 41:
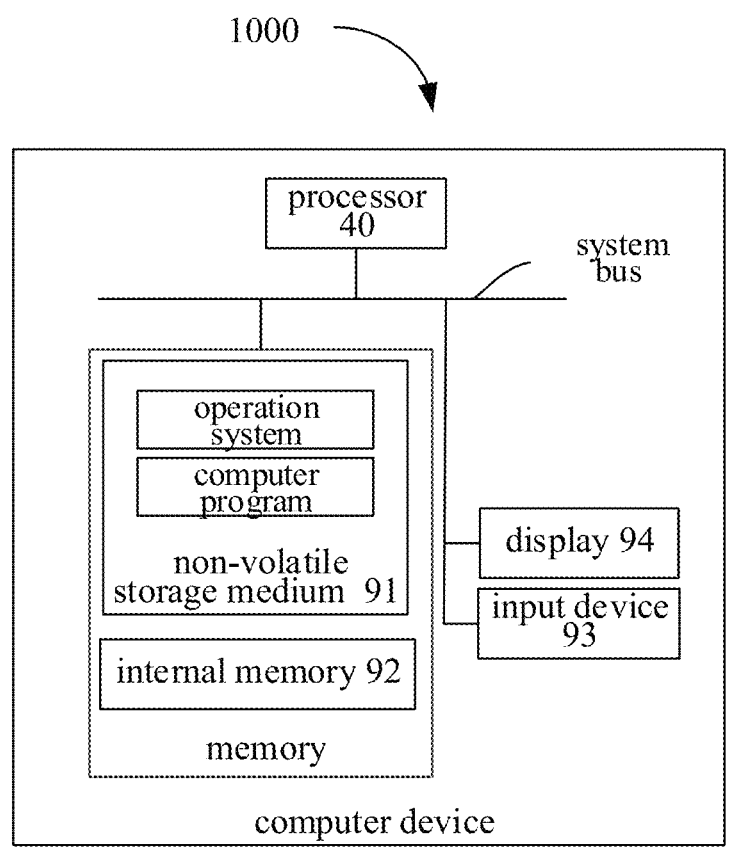
FIG. 41 is a block diagram illustrating a computer device according to some embodiments of the present disclosure.

As illustrated in FIGS. 40 and 41, embodiments of the present disclosure further provide a computer device 1000. The computer device 1000 includes a memory 91 and a processor 40. The memory 91 is configured to store computer readable instructions. When the instructions are executed by the processor 40, the processor 40 is configured to the control method of any of the above embodiments.

For example, a block 001 of obtaining a projection distance between the target user and the camera module 60 is executed. A block 002 of determining a control parameter of the camera module 60 according to the projection distance and controlling the camera module 60 based on the control parameter is executed.

For example, a block 011 of obtaining a facial image of the target user captured with a preset parameter is executed. A block 012 of obtaining the projection distance between the target user and the laser projector 30 according to the facial image is executed A block 013 of controlling the laser projector 30 to emit laser light with corresponding projection power according to the projection distance is executed.

For example, a block 021 of obtaining a projection distance between the target user and the laser projector 30 is executed. A block 022 of obtaining projection power corresponding to the laser projector 30 according to the projection distance is executed. A block 023 of controlling the laser projector 30 to emit the laser light with the projection power is executed.

For example, a block 041 of obtaining a projection distance between the target user and the laser projector 30 is executed. A block 042 of obtaining an energy density of the laser light emitted by the laser projector 30 with the preset parameter at a current distance, according to the projection distance is executed. A block 043 of adjusting the preset parameter according to the energy density and a security energy threshold and controlling the laser projector 30 based on the adjusted preset parameter is executed.

For example, a block 051 of obtaining the projection distance between a face of the target user and the target camera at a preset time interval when the target camera is on is executed. A block 052 of adjusting a capturing frame rate of the target camera and/or transmission power of the laser projector 30 according to the projection distance is executed. A block 053 of controlling the laser projector 30 to emit the laser light with the transmission power and controlling the target camera to capture the target image at the capturing frame rate is executed.

FIGS. 40 and 41 are schematic block diagrams illustrating internal modules of the computer device 1000. Taking FIG. 40 as an example, the computer device 1000 includes a processor 40, a memory 91 (e.g., a non-volatile storage medium 91), an internal memory 92, a display screen 94 and an input device 93 connected by a system bus 95. The memory 91 of the computer device 1000 has an operating system and computer readable instructions stored therein. The computer readable instructions are executable by the processor 40 to realize a control method described in any of the above implementations. The processor 40 may be configured to provide a calculating and controlling ability to support operations of the entire computer device 1000. The internal memory 92 of the computer device 1000 provides an environment for running the computer readable instructions stored in the memory 91. The display 94 of the computer device 1000 may be a liquid crystal display or an electronic ink display or the like. The input device 93 may be a touch layer covered on the display 94, or may be a button, trackball or touch board provided on a house of the computer device 1000, or an external keyboard, touch board or mouse. The computer device 1000 may be a phone, a tablet computer, a laptop, a personal digital assistant, or a wearable device (e.g., a smart wrist strap, a smart watch, a smart helmet, smart glasses). It may be conceivable for those skilled in the art that the structures illustrated in FIGS. 40 and 41 are merely schematic diagrams of partial structures related to the solution of the present disclosure, and do not limit the computer device 1000 to which the solution of the present application is applied. In detail, the computer device 1000 may include more or fewer components than those illustrated in the figures, or some components may be combined, or different component arrangements may be included.

Figure 42:
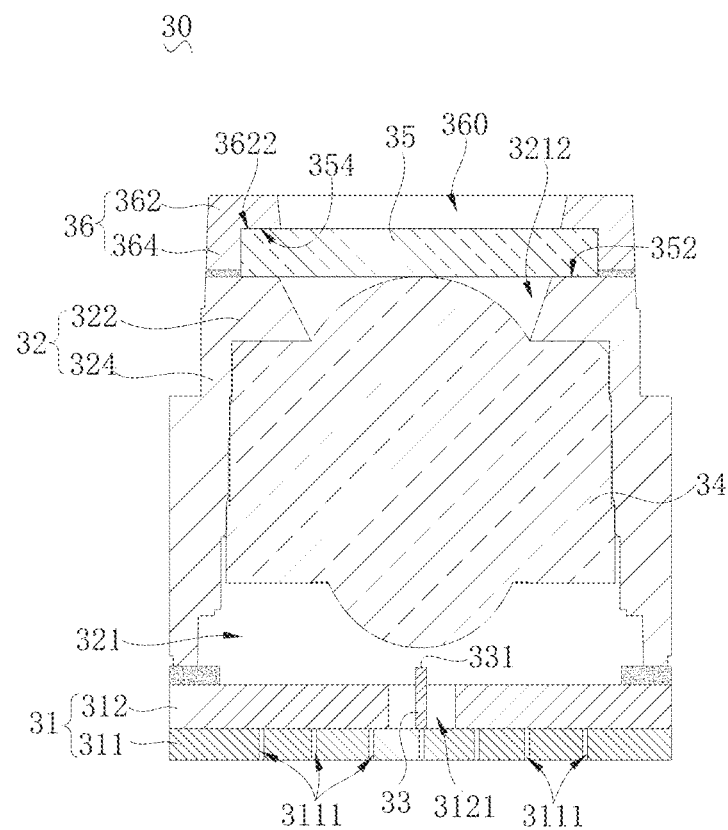
FIG. 42 is a structural diagram illustrating a laser projector according to some embodiments of the present disclosure.

As illustrated in FIG. 42, in some implementations, the laser projector 30 in the control method illustrated in FIGS. 2, 7, and 12 includes a substrate component 31, a lens tube 32, a light source 33, a collimating element 34, a diffractive optics element (DOE) 35 and a protective cover 36. The controller 50 is configured to control the projection power of the laser projector 30 by controlling emission power of the light source 33 of the laser projector 30.

The substrate component 31 includes a substrate 311 and a circuit board 312. The circuit board 312 is disposed on the substrate 311. The circuit board 312 is configured to couple the light source 33 and a main board of the terminal 100. The circuit board 312 may be a hard board, a soft board or a soft and hard combination board. In the embodiment illustrated as FIG. 42, the circuit board 312 is provided with a through hole 3121. The light source 33 is fixed on the substrate 311 and electrically connected to the circuit board 312. A heat dissipation hole 3111 can be formed on the substrate 311. The heat generated by the light source 33 or the circuit board 312 when working can be dissipated by the heat dissipation hole 3111. The heat dissipation hole 3111 can also be filled with thermal conductive adhesive to further improve the heat dissipation performance of the substrate component 31.

The lens tube 32 is fixedly connected to the substrate component 31. The lens tube 32 is formed with an accommodation cavity 321. The lens tube 32 includes a top wall 322 and an annular side wall 324 extending from the top wall 322. The side wall 324 is disposed on the substrate component 31. The top wall 322 is provided with a light through hole 3212 intercommunicating with the accommodation cavity 321. The side wall 324 can be coupled to the circuit board 312 by adhesive.

The protective cover 36 is disposed on the top wall 322. The protective cover 36 includes a baffle 362 having a light exit through hole 360 and an annular side wall 364 extending from the baffle 362.

The light source 33 and the collimating element 34 are both disposed in the accommodation cavity 321. The diffractive optical element 35 is arranged on the lens tube 32. The collimating element 34 and the diffractive optical element 35 are sequentially disposed on a light-emitting path of the light source 33. The collimating element 34 collimates the laser light emitted by the light source 33. The laser light passes through the collimating element 34 and the diffractive optical element 35 to form the laser light pattern.

Figure 43:
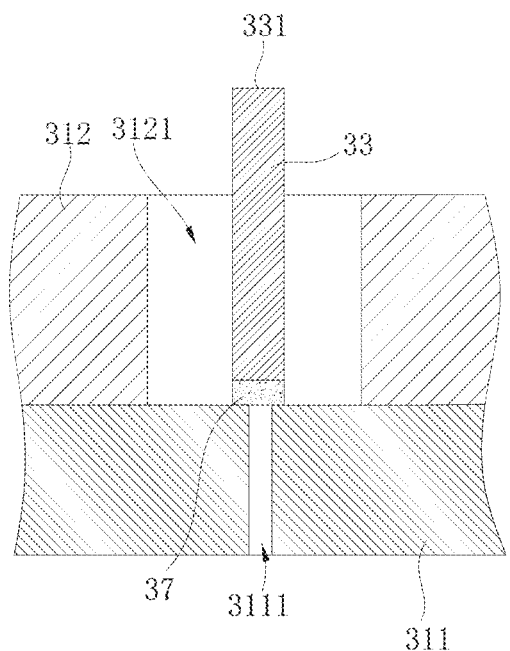
FIG. 43 is structural diagrams illustrating a part of a laser projector according to some embodiments of the present disclosure.
Figure 44:
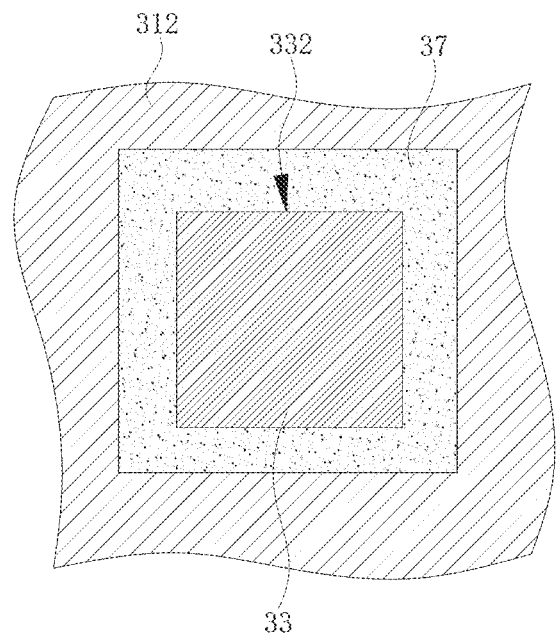
FIG. 44 is structural diagrams illustrating a part of a laser projector according to some embodiments of the present disclosure.

The light source 33 may be a vertical cavity surface emitting laser (VCSEL) or an edge-emitting laser (EEL). In the embodiment illustrated as FIG. 42, the light source 33 is the edge-emitting laser. In detail, the light source 33 may be a distributed feedback laser (DFB). The light source 33 is configured to emit the laser light into the accommodation cavity 312. As illustrated in FIG. 43, the light source 33 is substantially columnar. A surface of the light source 33 away from the substrate component 31 forms a light emitting surface 331. The laser light is emitted from the light emitting surface 331. The light emitting surface 331 faces the collimating element 34. The light source 33 is fixed on the substrate component 31. In detail, the light source 33 may be attached to the substrate component 31 by sealant 37. For example, a side surface of the light source 33 opposite to the light-emitting surface 331 is attached to the substrate component 31. As illustrated in FIGS. 42 and 44, the side surface 332 of the light source 33 may also be attached to the substrate component 31. The sealant 37 may enclose the side surface 332, attach a certain surface of the side surface 332 to the substrate component 31 or attach several surfaces to the substrate component 31. The sealant 37 may be thermal conductive adhesive to transfer the heat generated by the light source 33 when operating to the substrate component 31.

As illustrated in FIG. 42, the diffractive optical element 35 is supported by the top wall 322 and received in the protective cover 36. Opposite sides of the diffractive optical element 35 are respectively contact against the protective cover 36 and the top wall 322. The baffle 362 includes an abutting surface 3622 adjacent to the light through hole 3212. The diffractive optical element 35 contacts against the abutting surface 3622.

In detail, the diffractive optical element 35 includes a diffraction entrance surface 352 opposite to a diffraction exit surface 354. The diffractive optical element 35 is supported by the top wall 322. The diffraction exit surface 354 contacts against a surface of the baffle 362 closed to the light through hole 3212 (the abutting surface 3622). The diffraction entrance surface 352 contacts against the top wall 362. The light through hole 3212 is aligned with the accommodation cavity 321. The light exist through hole 360 is aligned with the light through hole 3212. The top wall 322, the annular side wall 364 and the baffle 362 are in contact with the diffractive optical element 35, thereby preventing the diffractive optical element 35 from falling out of the protective cover 36 in a light emitting direction. In some embodiments, the protective cover 36 is adhered to the top wall 362 by glue.

The light source 33 of the laser projector 30 is implemented as the edge-emitting laser. On one hand, temperature drift of the edge-emitting laser is smaller than that of the VCSEL array. On the other hand, since the edge-emitting laser is a single-point illumination structure, it is not necessary to design an array structure, the manufacture is sample, and the cost of the light source of the laser projector 30 is low.

When the laser light of the distributed feedback laser propagates, the gain of the power is obtained through feedback of a grating structure. To increase the power of the distributed feedback laser, it is necessary to increase an injecting current and/or increase a length of the distributed feedback laser. Since increasing the injecting current will increase power consumption of the distributed feedback laser and cause serious heat generation, in order to ensure normal operations of the distributed feedback laser, it is necessary to increase the length of the distributed feedback laser. Therefore, the distributed feedback laser is generally elongated structured. When the light emitting surface 331 of the edge-emitting laser faces the collimating element 34, the edge-emitting laser is placed vertically. Due to the elongated structure of the edge-emitting laser, the edge-emitting laser may be prone to accidents such as dropping, shifting or shaking. The accidents such as dropping, shifting or shaking may be avoided by fixing the edge-emitting laser with the sealant 37.

Figure 45:
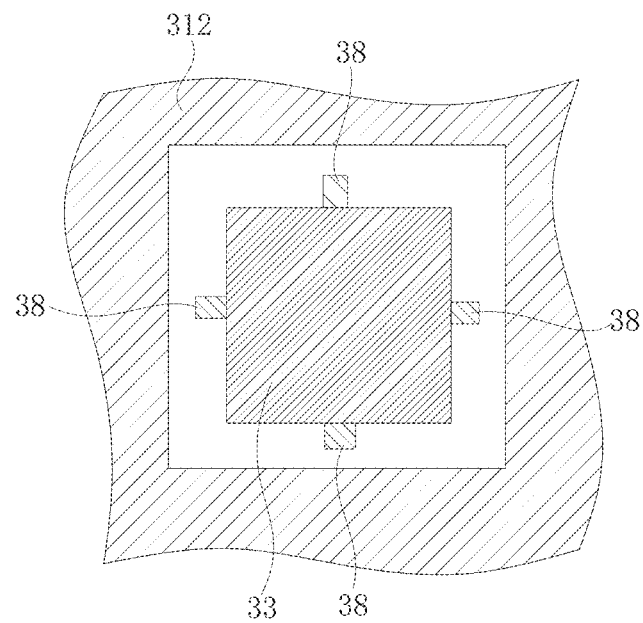
FIG. 45 is structural diagrams illustrating a part of a laser projector according to some embodiments of the present disclosure

As illustrated in FIGS. 42 and 45, in some implementations, the light source 33 can also be fixed to the substrate component 31 in a fixed manner as illustrated in FIG. 45. In detail, the laser projector 30 includes a plurality of support blocks 38. The support blocks can be fixed to the substrate component 31. The plurality of the support blocks 38 collectively surround the light source 33. The light source 33 can be mounted directly among the plurality of the support blocks 38 during installation. In one example, the plurality of the support blocks 38 collectively clamp the light source 33 to further prevent the light source 33 from shaking.

In some implementations, the protective cover 36 may be omitted. At this time, the diffractive optical element 35 may be disposed in the accommodation cavity 321. A diffraction exit surface 354 of the diffractive optical element 35 may contact against the top wall 322. The laser light passes through the diffractive optical element 35 and the light through hole 3212. Thus, the diffractive optical element 35 is less fell off.

In some implementations, the substrate 311 can be omitted. The light source 33 can be directly fixed to the circuit board 312 to reduce an overall thickness of the laser projector 30.

It may be conceivable for a person skilled in the art that all or part of the process of implementing the above method illustrated in the embodiments can be executed by a computer program instructing related hardware. The program can be stored in a nonvolatile computer readable storage medium. The program, when being executed, may include the flow of the embodiments of the methods as described above. The storage medium may be a magnetic disk, an optical disk, a read-only memory (ROM), or the like.

The above embodiments are only several implementations of the present disclosure, which are described specifically and in detail, but cannot therefore be construed as limitations on the scope of the patent disclosure. It should be noted that, for those skilled in the art, modifications and improvements made without departing from the concept of the present disclosure all fall within the protective scope of the present disclosure. Therefore, the protective scope of the present disclosure shall be determined by appended claims.

What is claimed is:

1. A method for controlling a camera module, comprising:
obtaining a facial image of a target user;
calculating a first ratio of a face to the facial image;
calculating a second ratio of a preset feature area of the face in the facial image to the face:
calculating a projection distance based on a preset projection distance, a relationship between the first ratio and a first calibration ratio, a relationship between the second ratio and a second calibration ratio, wherein the first calibration ratio and the second calibration ratio are determined based on the preset projection distance; and
determining a control parameter of the camera module according to the projection distance and controlling the camera module based on the control parameter.

2. The method of claim 1, wherein the camera module comprises a laser projector,
obtaining the projection distance between the target user and the camera module comprises:
obtaining a projection distance between the target user and the laser projector, and
determining the control parameter of the camera module according to the projection distance and controlling the camera module based on the control parameter comprises at least one of:
determining projection power according to the projection distance and controlling the laser projector to emit laser light with the projection power according to the projection distance; and
obtaining an energy density of laser light emitted by the laser projector with a preset parameter at a current distance according to the projection distance; adjusting the preset parameter according to the energy density and a security energy threshold; and controlling the laser projector with an adjusted preset parameter.

3. The method of claim 2, wherein obtaining the projection distance between the target user and the laser projector comprises:
transmitting a detection signal by the laser projector to the target user; and
calculating the projection distance according to a detection signal reflected by the target user.

4. The method of claim 3, wherein determining projection power according to the projection distance comprises:
determining an age of the target user based on the facial image, and adjusting the projection power based on the age; or determining whether the target user wears glasses, and in response to determining that the target user wears glasses, reducing the projection power.

5. The method of claim 2, wherein adjusting the preset parameter according to the energy density and the security energy threshold and controlling the laser projector with the adjusted preset parameter comprises at least one of:
reducing at least one of projection power of the laser projector, projection frequency of the laser projector and pulse width of the laser light projected by the laser projector, in response to determining that the energy density is greater than the security energy threshold; and
controlling the laser projector to turn off, in response to determining that the projection distance is less than a security distance threshold.

6. The method of claim 1, further comprising:
obtaining a scene image of a target scene;
determining whether a face exists in the scene image; and
in response to determining that the face exists in the scene image, obtaining the facial image of the target user.

7. The method of claim 1, wherein calculating the projection distance based on the first ratio comprises at least one of:
determining whether the target user wears glasses according to the facial image, and in response to determining that the target user wears glasses, calculating the projection distance based on the first ratio and a preset distance coefficient; and
determining an age of the target user according to the facial image, and calculating the projection distance based on the first ratio and the age of the target user.

8. The method of claim 1, wherein the camera module comprises a laser projector and a target camera, the control parameter comprises a capturing frame rate and/or transmission power, and
obtaining the projection distance between the target user and the camera module comprises:
obtaining the projection distance between a face of the target user and the target camera at a preset time interval, in response to determining that the target camera is on;
determining the control parameter of the camera module according to the projection distance and controlling the camera module based on the control parameter comprises:
adjusting at least one of the capturing frame rate of the target camera and the transmission power of the laser projector, according to the projection distance; and
controlling the laser projector to emit laser light with the transmission power, and controlling the target camera to capture the target image at the capturing frame rate.

9. The method of claim 8, wherein adjusting at least one of the capturing frame rate of the target camera and the transmission power of the laser projector according to the projection distance comprises at least one of:
  reducing the capturing frame rate of the target camera, in response to determining that the projection distance is less than a first distance threshold and greater than a second distance threshold;
  reducing the capturing frame rate of the target camera and the transmission power of the laser projector, in response to determining that the projection distance is less than or equal to a second distance threshold;
  reducing a driving current of the laser projector to a preset percentage of a rated driving current of the laser projector, in response to determining that the projection distance is less than or equal to the second distance threshold and greater than a third distance threshold;
  reducing the driving current of the laser projector to be less than a current threshold, in response to determining that the projection distance is less than or equal to the third distance threshold, the current threshold being less than the preset percentage of the rated driving current; and
  recovering the capturing frame rate of the target camera to a standard frame rate and recovering the transmission power of the laser projector to a rated power, in response to determining that the projection distance is greater than or equal to the first distance threshold.

10. The method of claim 8, wherein the target image comprises a target speckle image; and obtaining the projection distance between the face of the target user and the target camera comprises:
  calculating a depth image according to a captured target speckle image and a stored reference speckle image, wherein the reference speckle image is a stored speckle image for camera calibration, and the reference speckle image carries reference depth information;
  determining a ratio of an effective value area of the depth image to the depth image; and
  obtaining the projection distance between the face and the target camera based on the ratio.

11. The method of claim 10, further comprising:
  obtaining a projection distance between the face and the target camera collected by a distance sensor, in response to determining that the projection distance obtained based on the ratio is less than a first distance threshold.

12. A terminal, comprising a camera module, wherein the terminal further comprises:
  a processor, configured to:
    obtain a facial image of a target user;
    calculate a first ratio of a face to the facial image;
    calculate a second ratio of a preset feature area of the face in the facial image to the face;
    calculate a projection distance based on a preset projection distance, a relationship between the first ratio and a first calibration ratio, a relationship between the second ratio and a second calibration ratio, wherein the first calibration ratio and the second calibration ratio are determined based on the preset projection distance; and
    determine a control parameter of the camera module according to the projection distance; and
  a controller, configured to control the camera module based on the control parameter.

13. The terminal of claim 12, wherein the camera module comprises a laser projector, and
  the processor is configured to obtain a projection distance between the target user and the laser projector; and
  the processor is configured to determine the control parameter of the camera module according to the projection distance by at least one of:
    determining projection power according to the projection distance; and
    obtaining an energy density of laser light emitted by the laser projector with a preset parameter at a current distance according to the projection distance; adjusting the preset parameter according to the energy density and a security energy threshold; and
  the controller is further configured to control the laser projector to emit laser light with the projection power according to the projection distance; or control the laser projector with an adjusted preset parameter.

14. The terminal of claim 13, further comprising a distance detecting module, wherein the distance detecting module is configured to obtain the projection distance between the target user and the laser projector, and comprises:
  a transmitter, configured to transmit a detection signal to the target user;
  a receiver, configured to receive a detection signal reflected by the target user; and
  a calculator, configured to calculate the projection distance based on the detection signal reflected by the target user.

15. The terminal of claim 14, wherein the terminal further comprises an image capturing device, the image capturing device is configured to obtain a facial image of the target user; and
  the processor is further configured to determine an age of the target user based on the facial image and adjust the projection power based on the age; or determine whether the target user wears glasses, and in response to determining that the target user wears glasses, reduce the projection power.

16. The terminal of claim 13, wherein the controller is configured to:
  reduce at least one of projection power of the laser projector, projection frequency of the laser projector and pulse width of the laser light projected by the laser projector, in response to determining that the energy density is greater than the security energy threshold; or
  control the laser projector to turn off, in response to determining that the projection distance is less than a security distance threshold.

17. The terminal of claim 12, wherein,
  the camera module is further configured to obtain a scene image of a target scene;
  the processor is further configured to:
    determine whether a face exists in the scene image; and
    in response to determining that the face exists in the scene image, obtain the facial image of the target user.

18. The terminal of claim 12, wherein the processor is further configured to calculate the projection distance based on the first ratio by at least one of:
  determining whether the target user wears glasses according to the facial image, and in response to determining that the target user wears glasses, calculating the projection distance based on the first ratio and a preset distance coefficient; and
  determining an age of the target user according to the facial image, and calculating the projection distance based on the first ratio and the age of the target user.

19. The terminal of claim 12, wherein the camera module comprises a laser projector and a target camera, the control parameter comprises a capturing frame rate and/or transmission power, the controller comprises a first processing unit, the processor comprises a second processing unit, the first processing unit is connected to the second processing unit, the target camera and the laser projector respectively;

the second processing unit is configured to:
obtain a projection distance between a face of the target user and the target camera at a preset time interval, in response to determining that the target camera is on; and
adjust at least one of the capturing frame rate of the target camera and the transmission power of the laser projector, according to the projection distance;
the first processing unit is configured to control the laser projector to emit laser light with the transmission power, and control the target camera to capture the target image at the capturing frame rate.

20. The terminal of claim 19, wherein the second processing unit is further configured to adjust at least one of the capturing frame rate of the target camera and the transmission power of the laser projector, according to the projection distance by at least one of:

reducing the capturing frame rate of the target camera, in response to determining that the projection distance is less than a first distance threshold and greater than a second distance threshold;
reducing the capturing frame rate of the target camera and the transmission power of the laser projector, in response to determining that the projection distance is less than or equal to a second distance threshold;
reducing a driving current of the laser projector to a preset percentage of a rated driving current of the laser projector, in response to determining that the projection distance is less than or equal to the second distance threshold and greater than a third distance threshold;
reducing the driving current of the laser projector to be less than a current threshold, in response to determining that the projection distance is less than or equal to the third distance threshold, the current threshold being less than the preset percentage of the rated driving current; and
recovering the capturing frame rate of the target camera to a standard frame rate and recovering the transmission power of the laser projector to a rated power, in response to determining that the projection distance is greater than or equal to the first distance threshold.

21. The terminal of claim 19, wherein the first processing unit is configured to calculate a disparity image based on a captured target speckle image and a stored reference speckle image, and transmit the disparity image to the second processing unit, in which the reference speckle image is a stored speckle image for camera calibration, and the reference speckle image carries reference depth information;

the second processing unit is further configured to:
calculate a depth image according to the disparity image, and determine a ratio of an effective value area of the depth image to the depth image; and
obtain the projection distance between the face and the target camera according to the ratio.

22. The terminal of claim 21, wherein the second processing unit is further configured to:
obtain a type of an application, and determine a security level corresponding to the type, wherein the application is configured to transmit a facial depth information request to the second processing unit; and
switch operation modes according to the security level, receive the disparity image in a first operation mode and calculate the depth image according to the disparity image in the first operation mode in response to determining that the security level is high, and receive the disparity image in the first operation mode and calculate the depth image according to the disparity image in a second operation mode in response to determining that the security level is low.

23. The terminal of claim 21, wherein the terminal further comprises a distance sensor, the distance sensor is coupled to the second processing unit;
the distance sensor is configured to collect the projection distance between the face and the target camera; and
the second processing unit is further configured to obtain the projection distance between the face and the target camera collected by the distance sensor, in response to determining that the projection distance obtained according to the ratio is less than a first distance threshold.

24. A nonvolatile computer readable storage medium comprising computer executable instructions, wherein when the computer executable instructions are executed by one or more processors, the one or more processors are configured to:
obtain a facial image of a target user;
calculate a first ratio of a face to the facial image;
calculate a second ratio of a preset feature area of the face in the facial image to the face;
calculate a projection distance based on a preset projection distance, a relationship between the first ratio and a first calibration ratio, a relationship between the second ratio and a second calibration ratio, wherein the first calibration ratio and the second calibration ratio are determined based on the preset projection distance; and
determine a control parameter of a camera module according to the projection distance and control the camera module based on the control parameter.

* * * * *